(12) United States Patent
Yoshida

(10) Patent No.: US 11,563,255 B2
(45) Date of Patent: Jan. 24, 2023

(54) POWER SUPPLY DEVICE, AND SEPARATOR FOR POWER SUPPLY DEVICE

(71) Applicant: SANYO Electric Co., Ltd., Daito (JP)

(72) Inventor: Naotake Yoshida, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 227 days.

(21) Appl. No.: 16/954,291

(22) PCT Filed: Nov. 15, 2018

(86) PCT No.: PCT/JP2018/042198
§ 371 (c)(1),
(2) Date: Jun. 16, 2020

(87) PCT Pub. No.: WO2019/123903
PCT Pub. Date: Jun. 27, 2019

(65) Prior Publication Data
US 2021/0143508 A1    May 13, 2021

(30) Foreign Application Priority Data

Dec. 19, 2017  (JP) .............................. JP2017-243247

(51) Int. Cl.
*H01M 50/291*   (2021.01)
*H01M 10/0525*  (2010.01)
(Continued)

(52) U.S. Cl.
CPC ..... *H01M 50/291* (2021.01); *H01M 10/0525* (2013.01); *H01M 10/613* (2015.04);
(Continued)

(58) Field of Classification Search
CPC .......... H01M 50/291; H01M 10/0525; H01M 10/613; H01M 10/625; H01M 10/647;
(Continued)

(56) References Cited

U.S. PATENT DOCUMENTS 10,027,003 B2 * 7/2018 Toshioka ............ H01M 10/647
2006/0093899 A1  5/2006 Jeon et al.
(Continued)

FOREIGN PATENT DOCUMENTS

CN    104137294 A * 11/2014 ............. B60L 50/50
CN    104752649 A    7/2015
(Continued)

OTHER PUBLICATIONS

Extended European Search Report dated Feb. 5, 2021, issued in counterpart EP application No. 18891972.4. (36 pages).
(Continued)

*Primary Examiner* — Kaity V Chandler
(74) *Attorney, Agent, or Firm* — WHDA, LLP

(57) ABSTRACT

A power supply device includes a plurality of rectangular battery cells stacked in the thickness direction, and a plurality of separators interposed between adjacent battery cells. The separator includes an insulating separator frame that forms a defined space surrounded in a frame shape, and a separator core that is inserted into the defined space surrounded by the separator frame and is disposed between the adjacent battery cells.

13 Claims, 28 Drawing Sheets

(51) Int. Cl.
*H01M 50/209* (2021.01)
*H01M 50/249* (2021.01)
*H01M 10/613* (2014.01)
*H01M 10/625* (2014.01)
*H01M 10/647* (2014.01)
*H01M 10/6557* (2014.01)
*H01M 10/6566* (2014.01)

(52) U.S. Cl.
CPC ....... *H01M 10/625* (2015.04); *H01M 10/647* (2015.04); *H01M 10/6557* (2015.04); *H01M 10/6566* (2015.04); *H01M 50/209* (2021.01); *H01M 50/249* (2021.01); *H01M 2220/20* (2013.01)

(58) Field of Classification Search
CPC ......... H01M 10/6557; H01M 10/6566; H01M 50/209; H01M 50/249; H01M 2220/20; H01M 50/20; Y02E 60/10
See application file for complete search history.

(56) References Cited

U.S. PATENT DOCUMENTS

| | | | | |
|---|---|---|---|---|
| 2008/0299453 | A1* | 12/2008 | Shinyashiki | H01M 6/46 429/152 |
| 2014/0370363 | A1 | 12/2014 | Oshiba et al. | |
| 2015/0037649 | A1* | 2/2015 | Wyatt | H01M 50/507 429/152 |
| 2015/0333304 | A1* | 11/2015 | Sekine | H01M 10/625 429/153 |
| 2016/0301050 | A1* | 10/2016 | Peng | H01M 50/262 |
| 2017/0294634 | A1* | 10/2017 | Choi | H01M 50/211 |
| 2018/0138560 | A1 | 5/2018 | Bessho | |
| 2018/0219261 | A1* | 8/2018 | Drews | H01M 10/647 |

FOREIGN PATENT DOCUMENTS

| | | | | |
|---|---|---|---|---|
| CN | 105723560 B | * | 12/2017 | ........ H01M 10/0486 |
| CN | 207743257 U | * | 8/2018 | ............ Y02E 60/10 |
| EP | 3182482 A1 | | 6/2017 | |
| JP | 2006-128122 A | | 5/2006 | |
| JP | 2010-10460 A | | 1/2010 | |
| JP | 2015-201289 A | | 11/2015 | |
| JP | 6073583 B2 | | 2/2017 | |
| KR | 20090043429 A | * | 5/2009 | .......... H01M 10/625 |
| KR | 20170054755 A | * | 5/2017 | ............ H01M 60/10 |
| WO | 2013/146561 A1 | | 10/2013 | |
| WO | 2017/017914 A1 | | 2/2017 | |
| WO | WO-2018176296 A1 | * | 10/2018 | .............. H01M 2/10 |

OTHER PUBLICATIONS

International Search Report dated Feb. 12, 2019, issued in counterpart application No. PCT/JP2018/042198, with English translation. (3 pages).

English Translation of Search Report dated Mar. 18, 2022, issued in counterpart CN Application No. 201880087778.4. (3 pages).

* cited by examiner

POWER SUPPLY DEVICE, AND SEPARATOR FOR POWER SUPPLY DEVICE

TECHNICAL FIELD

The present invention relates to a power supply device obtained by stacking a plurality of rectangular battery cells with a separator interposed between the battery cells, and to a separator used for this power supply device.

BACKGROUND ART

In a power supply device including a plurality of rectangular battery cells, the plurality of rectangular battery cells are generally stacked with a separator having an insulating property interposed between the battery cells so as to configure a battery stack, and a pair of end plates disposed on both end faces of this battery stack are fastened with a bind bar (see PTL 1). In this power supply device, a plurality of battery cells are stacked while a short circuit between adjacent battery cells is prevented by stacking battery cells each having an electrode body housed in a metal battery case with a separator having an insulating property interposed between battery cells.

This type of power supply device is required to have a high energy density per volume or a high energy density per weight, and it is also desired to employ a battery having a high energy density per volume or a high energy density per weight in a rectangular battery cell that constitutes the power supply device.

With the development of high-capacity battery cells and power supply devices, it becomes a more important issue to ensure safety in power supply devices. Especially in the fireproofing test, a heat insulation property of the separator is important. The heat insulation property of a separator is determined by the thermal conductivity and the thickness of the separator, and the thickness of the separator also affects the outer dimensions of the power supply device, and thus is an important parameter that determines the outer shape and characteristics of a power supply device.

On the other hand, according to the application of a power supply device, it is very inefficient to configure a power supply device to have an outer shape that fits the specifications of each vehicle type in, for example, a power supply device mounted on a vehicle. For this reason, there is an active movement to develop a standard platform, that is, to normalize and standardize the outer dimensions of a power supply device that does not depend on the battery cell capacity.

CITATION LIST

Patent Literature

PTL 1: Unexamined Japanese Patent Publication No. 2015-201289

SUMMARY OF THE INVENTION

The present invention has been made in view of such a background. An object of the present invention is to provide a feature that makes it possible to flexibly adapt to battery cells having a variety of specifications.

A power supply device according to an aspect of the present invention is a power supply device including a plurality of battery cells each having a rectangular shape stacked in a thickness direction, and a plurality of separators respectively interposed between adjacent battery cells, wherein each of the separators includes: a separator frame having an insulating property that forms a defined space surrounded in a frame shape; and a separator core that is inserted into the defined space surrounded by the separator frame and is disposed between the adjacent battery cells.

A separator according to an aspect of the present invention is a separator to be interposed between battery cells each having a rectangular shape stacked in the thickness direction, the separator including: a separator frame having an insulating property that forms a defined space surrounded in a frame shape; and a separator core that is inserted into the defined space surrounded by the separator frame and is disposed between the adjacent battery cells.

With the above power supply device having a structure in which the separators interposed between the stacked battery cells are coupled to each other by inserting the separator core into the frame-shaped separator frame, it is possible to select and employ separator cores having different materials or thicknesses depending on the specifications of the battery cells to be used, and to achieve an ideal power supply device suitable for the specifications of the battery cells. Moreover, since it is possible to share a member between different power supply devices, a manufacturing cost can be reduced. Furthermore, unlike a conventional power supply device in which a separator having a complicated shape is manufactured by integral molding with resin, a separator frame and a separator core are separately manufactured, which contributes to simplification of a molding die and reduction of the manufacturing cost.

With the above separator in which the separator core is inserted into and coupled to the frame-shaped separator frame as a separator to be interposed between the stacked battery cells, it is possible to select and employ separator frames or separator cores having different materials or thicknesses depending on the specifications of the battery cells to be used, and to achieve a separator according to the size and characteristics of the battery cells. Moreover, unlike a conventional separator integrally molded with a complicated shape, a separator frame and a separator core are separately manufactured, which contributes to simplification of a molding die and reduction of the manufacturing cost.

DESCRIPTION OF EMBODIMENTS

Figure 1:
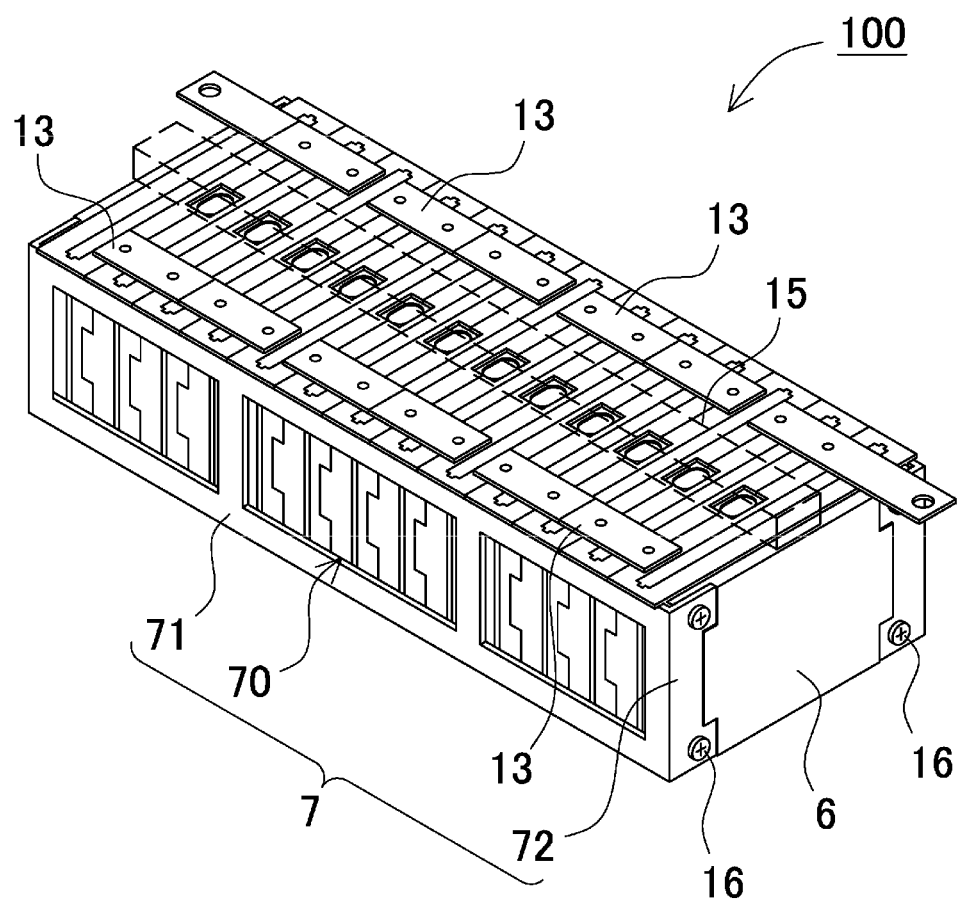
FIG. 1 is a perspective view of a power supply device according to a first exemplary embodiment of the present invention.

A power supply device according to an aspect of the present invention may be specified by the following configurations. The power supply device includes a plurality of rectangular battery cells 1 stacked in a thickness direction, and a plurality of separators 2 respectively interposed between adjacent battery cells 1. Separator 2 includes separator frame 3 having an insulating property that forms defined space 5 surrounded in a frame shape, and separator core 4 that is inserted into defined space 5 surrounded by separator frame 3 and is disposed between adjacent battery cells 1.

In separator 2, separator frame 3 may have a shape that fits an outer shape of rectangular battery cell 1 and have peripheral wall 30 that covers an outer peripheral surface of battery cell 1, and separator core 4 may have a plate shape, be located at an intermediate portion of separator frame 3 in the stacking direction of battery cells 1, be disposed in a vertical posture with respect to peripheral wall 30, and divide defined space 5 into two parts so as to form battery housing 50 that partially houses battery cell 1 on each surface side of separator core 4.

With the above configuration in which a plate-shaped separator core is disposed at an intermediate portion of a separator frame that covers an outer peripheral surface of a battery cell and the separator core divides a defined space into two parts so as to form a battery housing on each surface of the separator core, it is possible to partially house a battery cell in a battery housing formed on each surface, and to stack the plurality of battery cells while positioning the battery cells with the separators.

In separator 2, depth (h) of battery housings 50 may be ½ of thickness (d) of battery cells 1. With this configuration in which a battery cell is housed in opposed battery housings of separators with the battery cell being sandwiched, an outer peripheral surface of the battery cell is effectively covered with the separators stacked on both surfaces of the battery cell, so that the battery cell can be reliably insulated.

Peripheral wall 30 of separator frame 3 may be configured to include top wall 30C that partially covers top surfaces 1C of adjacent battery cells 1, and a pair of side walls 30B that partially cover outer surfaces 1B of adjacent battery cells 1. With this configuration in which top surfaces of adjacent battery cells are covered with a top wall and outer surfaces of adjacent battery cells are covered with a pair of side walls, outer peripheral surfaces of the battery cells can be effectively covered and insulated.

Peripheral wall 30 of separator frame 3 may be configured to further include bottom wall 30D that partially covers bottom surfaces 1D of adjacent battery cells 1. With this configuration in which bottom surfaces are covered with a bottom wall in addition to top surfaces and outer surfaces of adjacent battery cells, it is possible to effectively cover and insulate four sides of outer peripheral surfaces of the battery cells.

Separator frame 3 may be configured to have insertion opening 31 for separator core 4 at top wall 30C, and to include guide portions 32 that guide both side edges of separator core 4 inserted into defined space 5 from insertion opening 31 at a pair of side walls 30B. With this configuration, it is possible to dispose a separator core inserted from an insertion opening provided at a top wall of a separator frame at a fixed position in a defined space with a guide portion provided on side walls.

Moreover, separator frame 3 may be configured to have insertion opening 31 for separator core 4 at bottom wall 30D, and to include guide portions 32 that guide both side edges of separator core 4 inserted into defined space 5 from insertion opening 31 at a pair of side walls 30B. With this configuration, it is possible to dispose a separator core inserted from an insertion opening provided at a bottom wall of a separator frame at a fixed position in a defined space with guide portions provided on side walls.

Guide portion 32 of separator frame 3 may be guide slit 32A formed at side wall 30B, or guide groove 32B formed at inner surface of side wall 30B. With this configuration, it is possible to insert a separator core inserted from an insertion opening provided at a top wall or a bottom wall of a separator frame at a fixed position in a defined space while sliding the separator core along the guide slits or the guide grooves provided at side walls.

Moreover, separator frame 3 may have insertion opening 31 for separator core 4 at side wall 30B, and include guide portions 32 that guides upper and lower ends of separator core 4 inserted into defined space 5 from insertion opening 31 at top wall 30C and bottom wall 30D. With this configuration, it is possible to dispose a separator core inserted from an insertion opening provided at a side wall of a separator frame at a fixed position in a defined space with guide portions provided on a top wall and a bottom wall.

Guide portions 32 of separator frame 3 may be guide slits 32A formed at top wall 30C and bottom wall 30D, or guide grooves 32B formed at inner surfaces of top wall 30C and bottom wall 30D. With this configuration, it is possible to dispose a separator core inserted from an insertion opening provided at a side wall of a separator frame at a fixed position in a defined space while sliding the separator core along the guide grooves or the guide slits provided at a top wall and a bottom wall.

Separator 2 may have a configuration in which separator core 4 has an outer shape that fits an inner shape of separator frame 3, and separator core 4 can be press-fitted from the opening of defined space 5 with respect to separator frame 3 and disposed in defined space 5. Furthermore, in this separator 2, it is preferable that separator core 4 includes an engaging protrusion portion that protrudes outward from an outer peripheral surface, and the separator frame is provided with an engaging portion that guides the engaging protrusion portion at a peripheral wall, so that the engaging protrusion portion is guided to the engaging portion, and the separator core is disposed at an intermediate portion of the separator frame.

With the above configuration in which the separator core is press-fitted from the opening of the defined space of the separator frame so as to guide the engaging protrusion portion provided at the separator core to the engaging portion provided at the separator frame while disposing the separator core inside the separator frame, it is possible to fix the separator core at a fixed position in the defined space.

Separator 2 may have a configuration in which separator core 4 includes insertion protrusion portion 43 that protrudes outward from an outer peripheral surface, and separator frame 3 includes insertion portion 33 for inserting this insertion protrusion portion 43 at an intermediate portion of peripheral wall 30, so that insertion protrusion portion 43 is guided to insertion portion 33 and separator core 4 is coupled at a fixed position of separator frame 3.

With the above configuration in which an insertion protrusion portion provided at an outer peripheral surface of a separator core is guided to an insertion portion provided at an intermediate portion of a peripheral wall, the separator core is reliably coupled to a separator frame at a fixed position of the defined space.

Separator 2 may have a configuration in which separator core 4 has an outer shape that fits an inner shape of separator frame 3, and separator core 4 is inserted in the stacking direction of battery cells 1 with respect to separator frame 3 and is disposed in defined space 5. It is preferable that separator core 4 includes insertion protrusion portion 43 that protrudes outward from an outer peripheral surface, and separator frame 3 includes insertion concave portion 36 for guiding insertion protrusion portion 43 at peripheral wall 30, so that insertion protrusion portion 43 is guided to insertion concave portion 36, and separator core 4 is disposed at an intermediate portion of separator frame 3.

With the above configuration in which an insertion protrusion portion provided at a separator core is guided to an insertion concave portion provided at a separator frame while the separator core is inserted in the stacking direction of the battery cells with respect to the separator frame, it is possible to easily dispose the separator core at a fixed position in the defined space.

Separator 2 may have a configuration in which separator core 4 includes groove 49 that forms cooling gap 8 between separator core 4 and battery cell 1, and air flow opening 39 through which separator frame 3 communicates with cooling gap 8 is formed at peripheral wall 30. With this configuration, it is possible to cause a cooling gas to flow through the air flow opening formed at the peripheral wall of the separator frame to the cooling gap formed between the separator core and the battery cell so as to cool the battery cells.

Separator 2 may have a configuration in which separator core 4 puts an outer peripheral portion of an opposed surface opposed to battery cell 1 into close contact with an outer peripheral portion of main surface 1A of battery cell 1 as contact portion 44, and central concave portion 45 depressed in a concave shape is provided at a central portion of the opposed surface. With this configuration, it is possible to absorb a bulge of a central part of a battery cell with a central concave portion of a separator core while pressing an outer peripheral portion of the battery cell with a contact portion provided at an outer peripheral portion of the separator core.

Separator 2 may have a configuration in which separator core 4 fixes ring-shaped spacer 4b to the surface of flat plate body 4a, and contact portion 44 and central concave portion 45 are provided at an opposed surface opposed to battery cell 1. With this configuration, it is possible to simply and easily form a contact portion or a central concave portion at the opposed surface of the separator core. Moreover, the thickness of the separator core can be easily adjusted by changing the thickness of the spacer.

In the above power supply device, separator core 4 may have an insulating property. With this configuration in which a separator core having an insulating property is disposed between adjacent battery cells, it is possible to reliably insulate adjacent battery cells from each other and prevent a short circuit between the battery cells.

Furthermore, in above separator 2, separator core 4 may be formed of a flame-retardant material. With this configuration, it is possible to prevent damage of a separator core due to a temperature rise of the separator core itself, and thus it is possible to effectively prevent exposure when any of the battery cells undergoes thermal runaway.

Separator core 4 may be a heat exchange plate that is thermally coupled to main surface 1A of battery cell 1, and this heat exchange plate may internally include a circuit for circulating a heat exchange liquid. With this configuration in which the heat exchange liquid is circulated through the heat exchange plates disposed between adjacent battery cells, the temperature of the battery cells thermally coupled to these heat exchange plates can be efficiently adjusted. This power supply device can cool the battery cells with the heat exchange liquid when the temperature of the battery cells is high, and can heat the battery cells with the heat exchange liquid when the temperature of the battery cells is low in cold regions or in winter.

Separator core 4 may be configured as a heat conduction plate that is thermally coupled to main surface 1A of battery cell 1, and this heat conduction plate may include a heat radiation portion disposed outside a peripheral wall. With this configuration in which a heat conduction plate disposed between adjacent battery cells includes a heat radiation portion disposed outside a peripheral wall, it is possible to radiate heat generated at the battery cells thermally coupled to the heat conduction plate from the heat radiation portion to the outside and to achieve efficient cooling.

The power supply device may further include cooling plate 21 disposed on the surface of battery stack 9 in a thermally coupled state, so that the heat radiation portion of the heat conduction plate is thermally coupled to the cooling plate. With this configuration, it is possible to conduct heat generated at the battery cells thermally coupled to the heat conduction plate from the heat radiation portion to the cooling plate and to achieve further efficient cooling.

Separator 2 may have a configuration in which separator core 4 is provided with non-contact portion 46 that does not come into contact with opposed main surface 1A of battery cell 1 along an end opposed to top surface 1C and/or bottom surface 1D of battery cell 1. With this configuration, even in a state in which the battery stack is fastened in the stacking direction and strongly sandwiched from both end faces, it is possible to prevent ends of adjacent battery cells from being strongly pressed against each other by the non-contact portion formed at the upper end and/or the lower end of the separator core. Therefore, it is possible to avoid an upper end and/or a lower end of a battery cell from being strongly pressed and being exposed to concentrated stress, so as to effectively prevent damage or deformation of an end of the battery cell.

Furthermore, the power supply device may have a configuration in which battery stack 9 is formed by stacking a plurality of battery cells 1 with separator 2 interposed between adjacent battery cells 1, and further, a pair of end plates 6 disposed at both end faces of battery stack 9 in the stacking direction, and bind bars 7 that are disposed at both side surfaces of battery stack 9 and fasten a pair of end plates 6 are provided.

Furthermore, a separator according to an aspect of the present invention may be specified by the following configuration. The separator is a separator to be interposed between battery cells 1 having a rectangular shape stacked in a thickness direction, and includes: separator frame 3 having an insulating property that forms defined space 5 surrounded in a frame shape; and separator core 4 that is inserted into defined space 5 surrounded by separator frame 3 and is disposed between adjacent battery cells 1.

Separator 2 may have a configuration in which thickness (t) of separator core 4 is specified to be a difference between thickness (d) of battery cell 1 to be used and desired inter-cell distance (D) of battery cells 1 stacked on each other. In the above separator, the battery cells to be stacked can be arranged at predetermined interval (D) by changing the thickness of the separator core to be inserted into the separator frame according to thickness (d) of the battery cell to be used. As a result, it is possible to cause a member fixed as an exterior member to the battery stack to have the same size, to eliminate the complexity of management and the like of the member so as to improve the efficiency of manufacturing the power supply device, and to reduce the manufacturing cost.

Furthermore, separator 2 may have a configuration in which width (H) of separator frame 3 is specified to be the sum of thickness (t) of separator core 4 and thickness (d) of battery cell 1 to be used. With the above separator in which width (H) of the separator frame is the sum of thickness (d) of the battery cell to be used and thickness (t) of the separator core, it is possible to cover the entire outer peripheral surfaces of a plurality of battery cells that are stacked to form a battery stack with the separator frame so as to ensure reliable insulation.

Hereinafter, exemplary embodiments of the present invention will be described with reference to the drawings. However, the exemplary embodiments described below are examples for embodying the technical idea of the present invention, and the present invention is not limited to the following description. Moreover, this specification never limits the members described in the claims to the members of the exemplary embodiments. Unless otherwise specified, the dimensions, materials, shapes, relative positions, and the like of the configuration components described in the exemplary embodiments are not intended to limit the scope of the present invention but are merely illustrative examples. It is to be noted that the sizes, positional relationship, and the like of members illustrated in the drawings may be exaggerated for clarity of explanation. Furthermore, in the following description, the same names and reference numerals indicate the same or similar members, and detailed description will be appropriately omitted. Furthermore, regarding elements that configure the present invention, a plurality of elements may be composed of the same member so that one member serves as a plurality of elements, or conversely, the function of one member can be shared and achieved by a plurality of members.

FIRST EXEMPLARY EMBODIMENT

Figure 2:
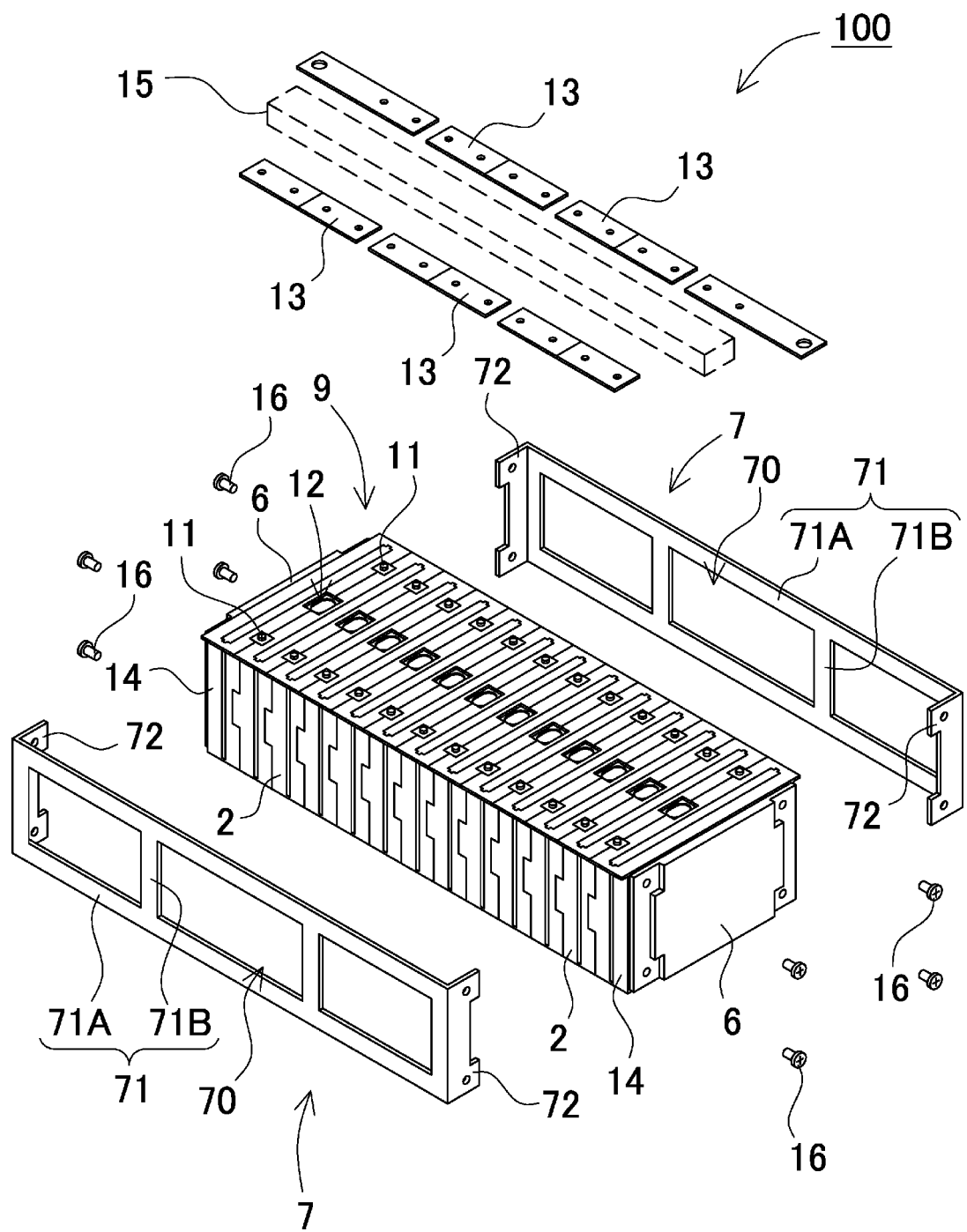
FIG. 2 is an exploded perspective view of the power supply device illustrated in FIG. 1.

FIG. 1 illustrates a perspective view of power supply device 100 according to a first exemplary embodiment of the present invention, and FIG. 2 illustrates an exploded perspective view of the power supply device. Power supply device 100 illustrated in these figures includes a plurality of rectangular battery cells 1 stacked in a thickness direction, and a plurality of separators 2 interposed between battery cells 1 adjacent to each other. Power supply device 100 illustrated in the figure configures battery stack 9 by alternately stacking a plurality of battery cells 1 and separators 2, a pair of end plates 6 are disposed at both ends of this battery stack 9, and the pair of end plates 6 are fastened with bind bars 7 disposed on both sides of battery stack 9.

(Battery Cell 1)

Battery cell 1 is a rectangular secondary battery having a width larger than a thickness of the battery cell, and battery cells 1 are stacked in the thickness direction to configure battery stack 9. Although not shown, battery cell 1 is a non-aqueous electrolyte solution battery having a battery case made of metal. Battery cell 1, which is the non-aqueous electrolyte solution battery, is a lithium-ion secondary battery. A power supply device that uses a lithium-ion secondary battery for battery cell 1 has a feature that the charging capacity with respect to the volume or mass of the entire battery cell can be increased. However, the battery cell can be any other secondary battery such as a nickel hydride battery or a nickel cadmium battery.

In battery cell 1, a metal battery case having a rectangular outer shape houses an electrode assembly and is filled with electrolyte. The metal battery case can be manufactured from aluminum or aluminum alloy. The battery case includes an exterior can obtained by pressing a metal sheet into a cylindrical shape that closes the bottom, and a sealing plate that hermetically closes the opening of this exterior can. Battery cell 1 having a rectangular outer shape includes main surface 1A that is an opposed surface of each of battery cells 1 stacked on each other and extends in the width direction, outer surfaces 1B that are located on both sides of battery cell 1 and extends in the thickness direction, bottom surface 1D that is a bottom side surface of the bottomed exterior can, and top surface 1C constituted of a sealing plate that closes the opening of the exterior can.

In this specification, it is to be noted that the vertical direction is an up-down direction of battery cell 1 illustrated in the figure, that is, a direction toward the bottom side of the exterior can is the down direction, and a direction toward the sealing plate side is the up direction. Moreover, in this specification, the right-left direction is the width direction of the main surface of the battery cell, and the front-rear direction is the stacking direction of the battery cells.

Furthermore, in battery cell 1, positive and negative electrode terminals 11 are provided at both ends of the sealing plate, and gas discharge portion 12 is provided between positive and negative electrode terminals 11. Gas discharge portion 12 is configured in a manner such that a valve is opened when the internal pressure of the battery case rises more than or equal to a predetermined value, so as to discharge internal gas. This battery cell 1 can stop the rise in the internal pressure of the battery case by opening the valve of gas discharge portion 12. Moreover, in power supply device 100, gas discharge duct 15 for exhausting gas discharged from gas discharge portion 12 of battery cell 1 to the outside can be disposed on an upper surface of battery stack 9 as shown by chain lines in FIG. 1.

Since the battery case of above battery cell 1 is made of metal, it is possible to effectively prevent a short circuit between adjacent battery cells 1 by configuring separator 2 disposed between adjacent battery cells 1 to have an insulating property in order to prevent the battery cases of stacked battery cells 1 from coming into contact with each other and causing a short circuit. In particular, separator 2 can effectively prevent a short circuit between electrode terminals at terminal surfaces and a short circuit between separator 2 and the outside by causing a part covering an outer peripheral surface of battery cell 1 to have an insulating property. Furthermore, the battery cell may have a configuration in which the surface of the battery case is covered with an insulating film, or the battery case is insulation-coated. For example, the surface of the battery case other than the terminal surface of the battery cell may be thermally welded and covered with a shrink tube of a polyethylene terephthalate (PET) resin or the like. As a result, the insulation property of the battery cells can be further improved, a short circuit due to dew condensation or the like can be reliably prevented, and high reliability can be achieved.

(Separator 2)

Figure 3:
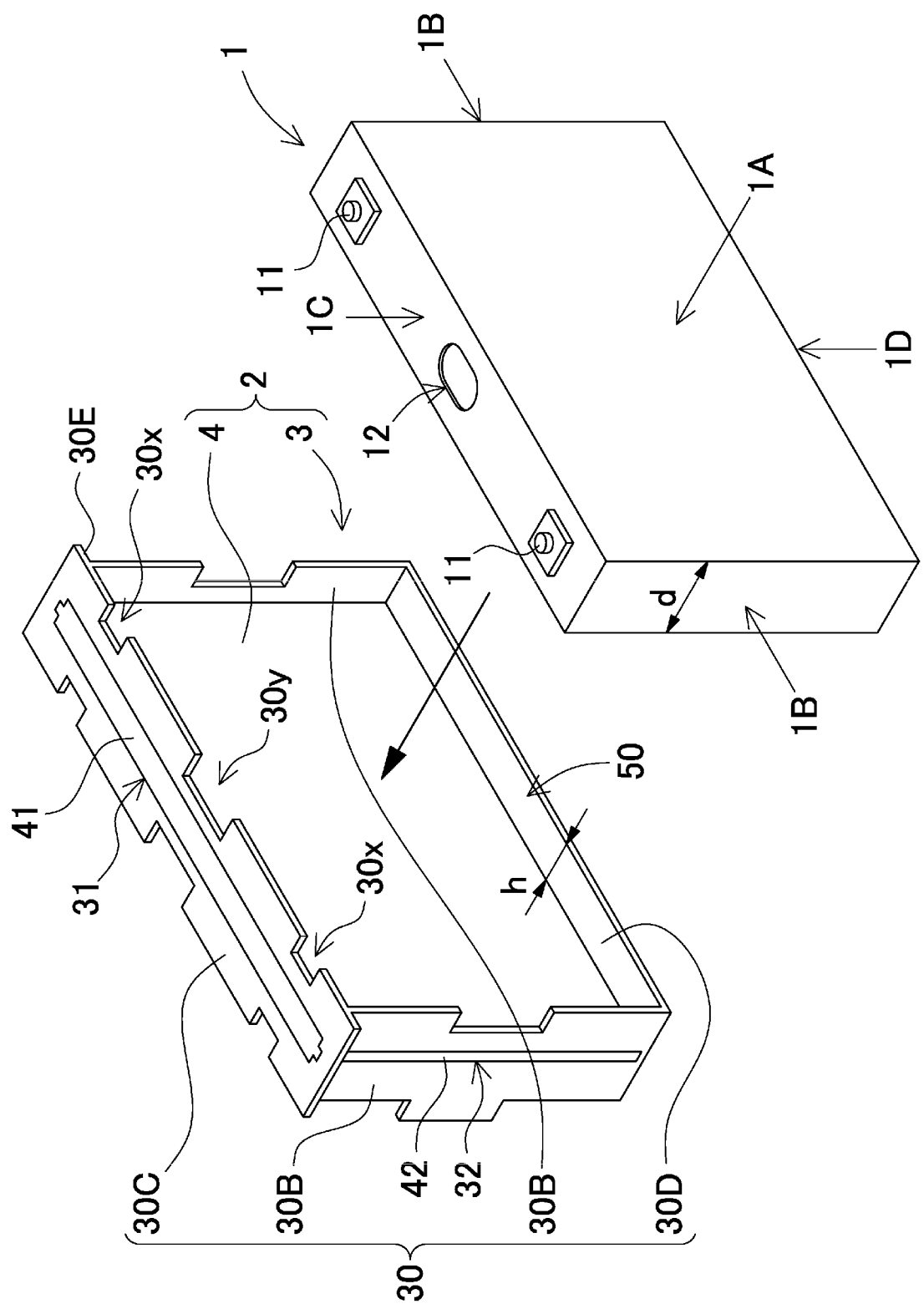
FIG. 3 is a perspective view of a separator and a battery cell of the power supply device illustrated in FIG. 2.
Figure 4:
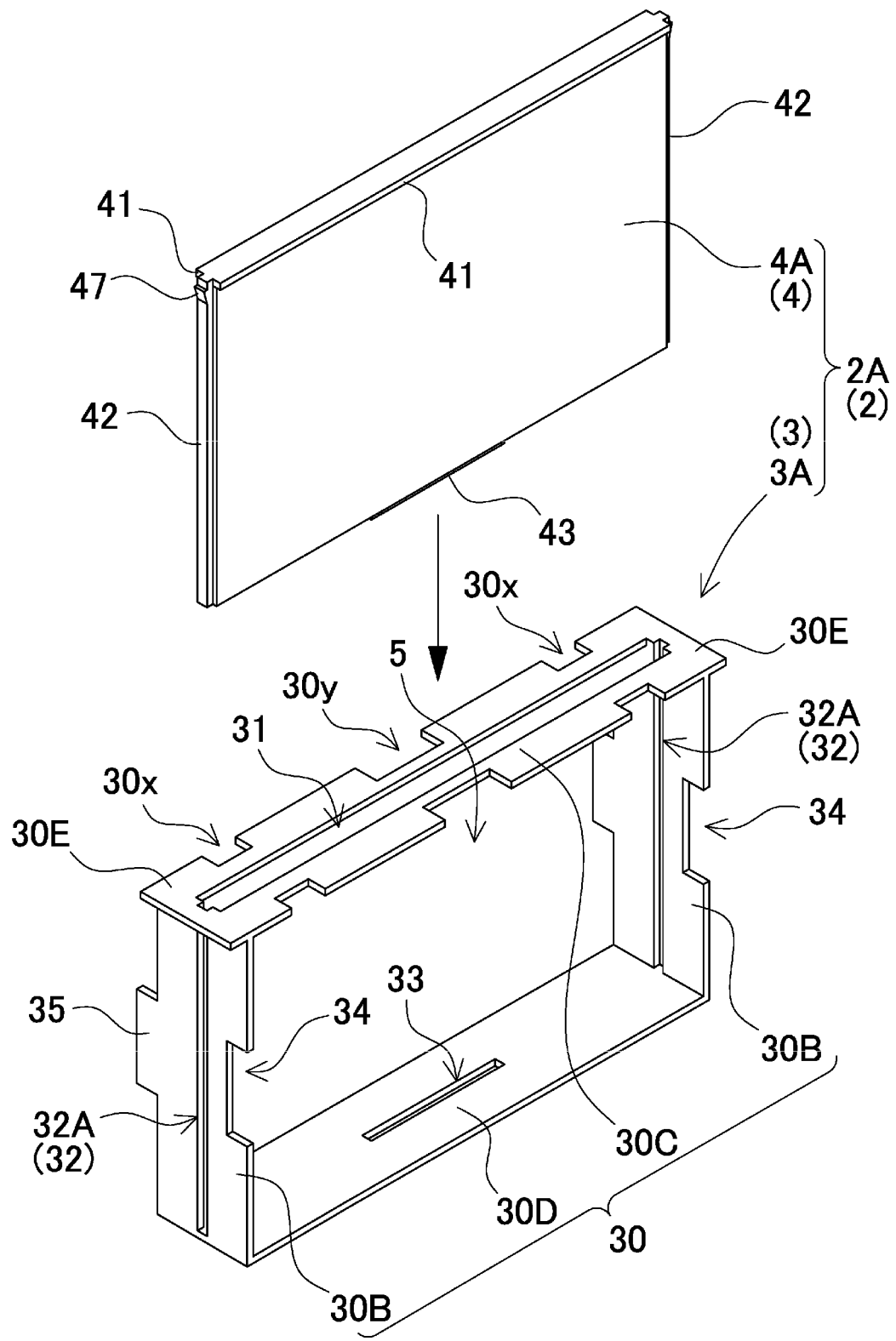
FIG. 4 is an exploded perspective view of the separator illustrated in FIG. 3.

Separator 2 is a spacer to be disposed between stacked battery cells 1, and is interposed between battery cells 1 adjacent to each other. FIGS. 3 and 4 are a perspective view and an exploded perspective view of separator 2, respectively. Separator 2 illustrated in these figures includes separator frame 3 having an insulating property that forms defined space 5 surrounded in a frame shape, and separator core 4 that is inserted into defined space 5 surrounded by separator frame 3 and is disposed between adjacent battery cells 1. In separator 2, separator frame 3 and separator core 4 are constituted of separate members, and are connected to each other in a state in which separator core 4 is inserted into defined space 5 of separator frame 3 as illustrated in FIG. 4.

Separator frame 3 is manufactured by molding a member having an insulating property, for example, a plastic into a predetermined shape. As described above, separator frame 3 having an insulating property can effectively prevent a short circuit between electrode terminals at terminal surfaces or a short circuit between separator frame 3 and the outside. Moreover, separator core 4 is also preferably formed of a plastic or the like into a predetermined shape so as to have an insulating property. Thus, separator core 4 having an insulating property can effectively prevent a short circuit between adjacent battery cells 1. However, since the surface of the battery case in battery cell 1 can be covered with an insulating film or the like for insulation as described above, the separator core is not necessarily required to have an insulating property. Particularly, in the present exemplary embodiment, separator frame 3 and separator core 4 can be separately manufactured as separate members, so that separator frame 3 and separator core 4 can be manufactured with different materials. For example, separator frame 3 can be made of plastic, and separator core 4 can be made of metal. Accordingly, in the present exemplary embodiment, ideal separator 2 can be achieved by molding separator frame 3 and separator core 4 according to a capacity or a type of battery cell 1 with a material having an optimal heat resistance, an optimal rigidity, an optimal thermal conductivity, or the like.

(Separator Frame 3)

Separator frame 3 is molded into a frame shape that fits an outer shape of rectangular battery cell 1, and has peripheral wall 30 that covers an outer peripheral surface of battery cell 1. Separator frame 3 illustrated in FIGS. 3 and 4 has peripheral wall 30 shaped along an outer periphery of main surface 1A of battery cell 1, so that this peripheral wall 30 covers an outer peripheral surface excluding main surface 1A. Peripheral wall 30 of separator frame 3 illustrated in the figures includes side walls 30B that partially cover outer surfaces 1B on both sides of battery cell 1, top wall 30C that partially covers top surface 1C that is an upper surface, and bottom wall 30D that partially covers bottom surface 1D. Both ends of top wall 30C and bottom wall 30D are coupled to each other by side walls 30B, so that peripheral wall 30 has an entire shape that is a rectangular frame shape.

Separator frame 3 has an inner shape into which battery cell 1 can be inserted from a main surface side, and an outer peripheral surface of battery cell 1 to be inserted is held by peripheral wall 30 so as to prevent positional deviation between adjacent battery cells 1. Separator frame 3 in the figures covers a substantially half of outer surface 1B and bottom surface 1D of battery cell 1 to be inserted with side walls 30B and bottom wall 30D. Moreover, separator frame 3 partially covers top surface 1C of battery cell 1 with top wall 30C while openings 30$x$ and 30$y$ for exposing electrode terminals and gas discharge portion 12 are provided, so that separator frame 3 covers top surfaces 1C of adjacent battery cells 1.

This separator frame 3 is preferably made of a hard plastic, for example, in order to achieve rigidity sufficient for holding outer peripheral surfaces of stacked battery cells 1. As such a plastic, polycarbonate can be used, for example. Moreover, the rigidity of separator frame 3 can also be improved by mixing glass fibers into a plastic material such as polycarbonate before molding.

(Separator Core 4)

Separator core 4 has a plate shape having a size substantially equal to a size of main surface 1A of opposed battery cell 1. Separator core 4 is inserted into an intermediate portion of separator frame 3 in the stacking direction of battery cells 1, and divides defined space 5 surrounded by separator frame 3 into two parts. Plate-shaped separator core 4 is preferably disposed on an inner surface of frame-shaped separator frame 3 without any gap. As a result, it is possible to suppress exposure or fire spread between adjacent battery cells 1.

Separator core 4 is preferably molded from a flame-retardant material, for example, a flame-retardant plastic in order to suppress heat conduction between adjacent battery cells 1 and prevent thermal runaway. As such a plastic, polycarbonate or polypropylene can be used, for example. Thus, since separator core 4 has an optimal structure for battery cell 1, it is possible to improve thermal insulation of separator 2, and to thermally insulate adjacent battery cells 1 so as to effectively prevent exposure or fire spread.

Furthermore, separator core 4 can have a heat resistance property improved by attaching a heat-insulating sheet to the surface, applying a flame-retardant paint, or the like and can prevent exposure. That is, separator core 4 can also be provided with functions such as heat resistance or insulation by a sheet material stacked on the surface, a paint applied on the surface, or the like. Since separator core 4 does not necessarily have to be formed of a plastic, separator core 4 may be constituted of a heat-insulating sheet.

(Battery Housing 50)

Separator 2 in FIG. 3 is located in a front-rear intermediate of separator frame 3 and has plate-shaped separator core 4 disposed in a vertical posture with respect to peripheral wall 30. As a result, separator core 4 divides defined space 5 surrounded by separator frame 3 into two parts so as to form battery housing 50 that partially houses battery cell 1 on each surface side of separator core 4. Regarding separator 2 in the figure, depth (h) of battery housing 50 is set to substantially ½ of thickness (d) of battery cell 1, so that peripheral wall 30 covers a substantially half of an outer peripheral surface of battery cell 1 housed in battery housing 50. This separator 2 is disposed between two adjacent battery cells 1, in other words, two separators 2 sandwich one battery cell 1 from both sides, so as to cover the entire outer peripheral surface of battery cell 1.

Separator frame 3 and separator core 4 that are constituted of separate members are coupled to each other as described below so as to form separator 2 having battery housings 50 on both surface sides. That is, separator cores 4 are disposed at fixed positions in intermediate portions of separator frames 3 and coupled to each other by a coupling structure that will be described below. It is to be noted that separator core 4 inserted into defined space 5 of separator frame 3 is coupled to separator frame 3 by an engaging structure, or fixed by adhesion, ultrasonic welding, or the like and disposed at a fixed position.

Coupling Example 1

(Separator 2A, 2B, 2C)

Figure 5:
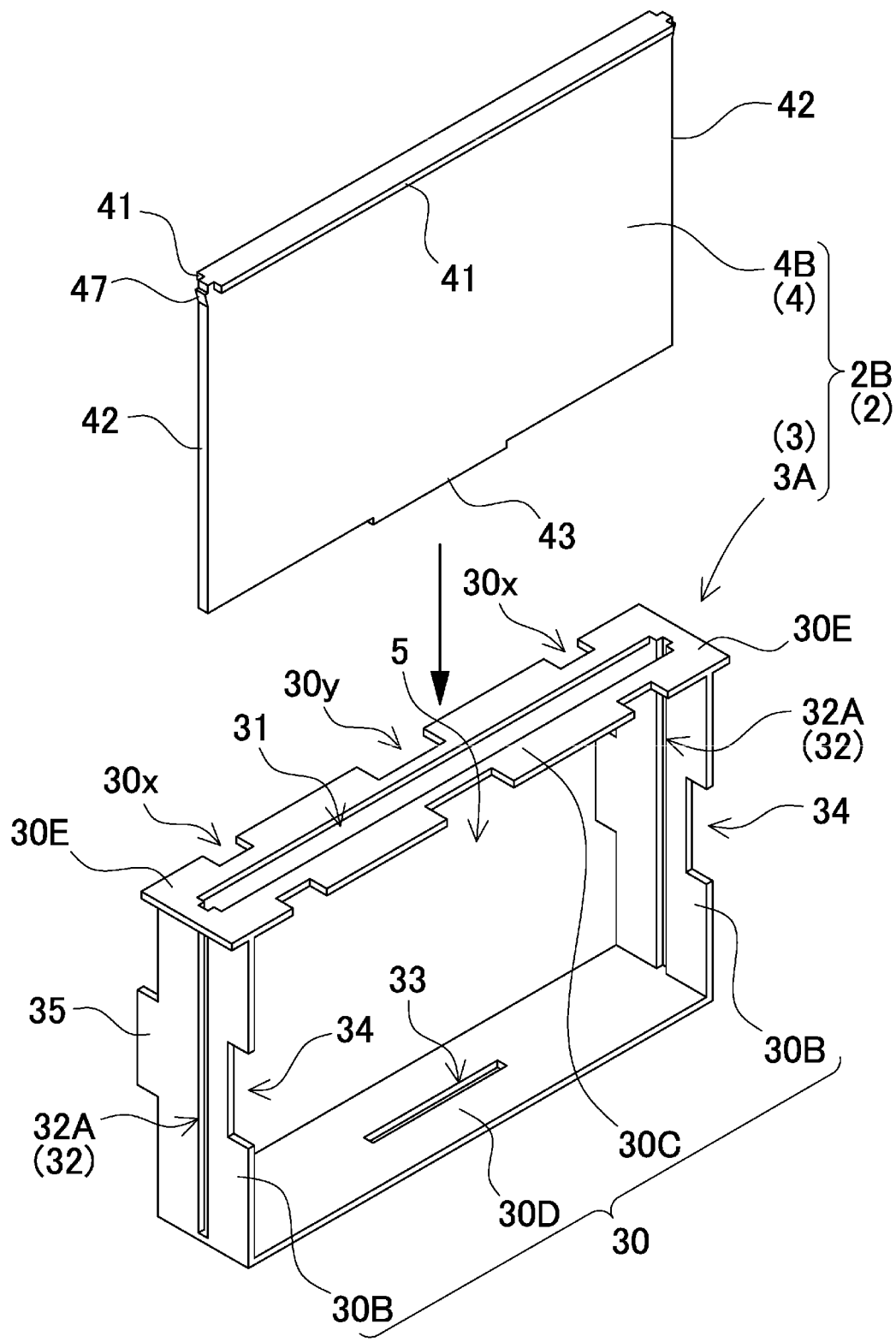
FIG. 5 is an exploded perspective view illustrating another example of the separator.
Figure 6:
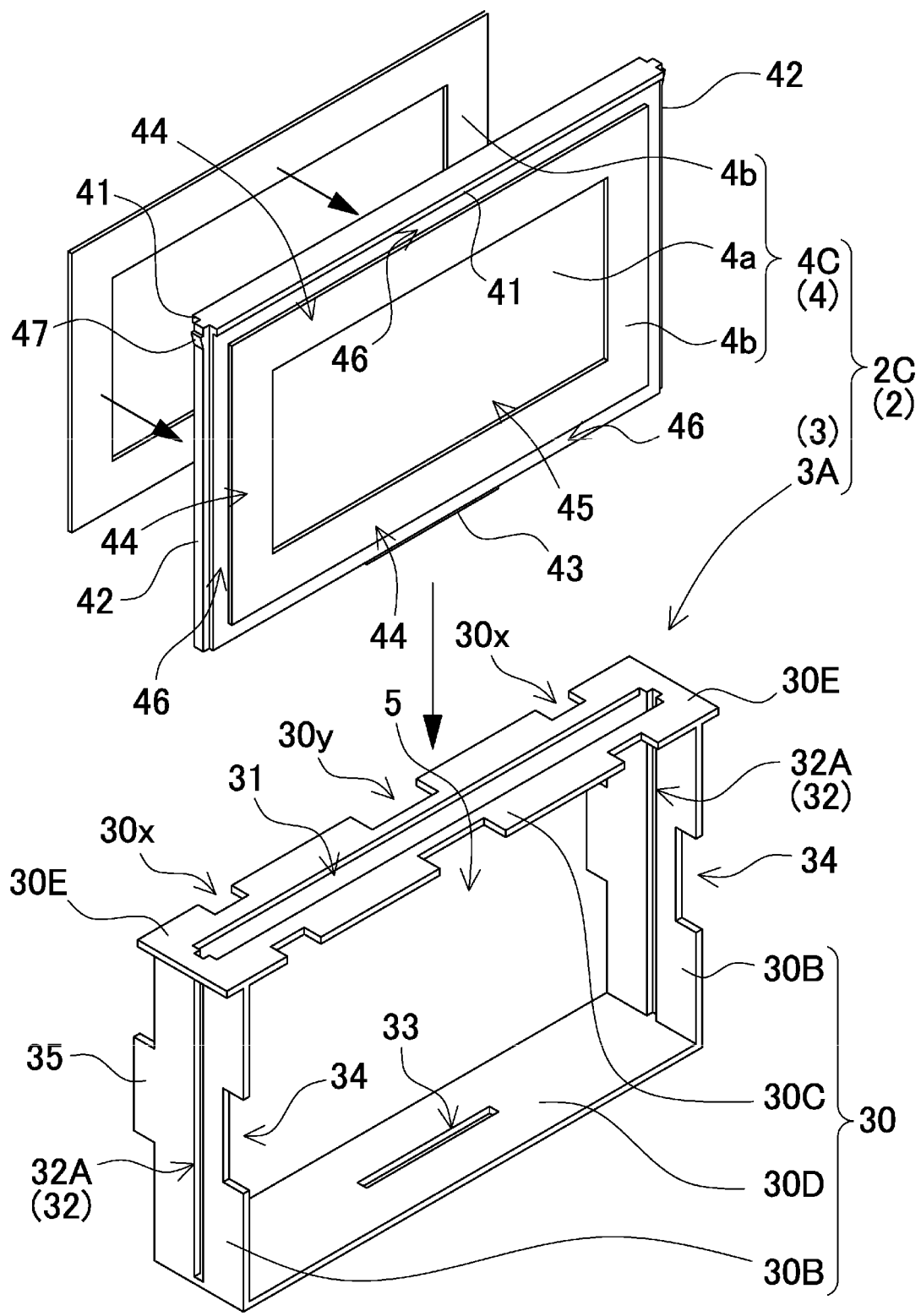
FIG. 6 is an exploded perspective view illustrating another example of the separator.

Separator 2A, 2B, 2C illustrated in FIGS. 3 to 6 has a configuration in which separator core 4A, 4B, 4C is vertically inserted with respect to separator frame 3A, and is disposed at an intermediate portion of separator frame 3A. Separator 2A, 2B, 2C illustrated in these figures has insertion opening 31 that is formed at top wall 30C of separator frame 3A for inserting separator core 4, so that plate-shaped separator core 4A, 4B, 4C is inserted from above through insertion opening 31 to below. However, separator 2 can have a structure in which insertion opening 31 is formed at bottom wall 30D of separator frame 3, and plate-shaped separator core 4 is inserted from below through insertion opening 31 to above, as will be described in detail later. Here, separator cores 4A, 4B, 4C illustrated in FIGS. 4 to 6 have different thicknesses. Specifically, separator core 4B illustrated in FIG. 5 is formed thinner than separator core 4A illustrated in FIG. 4, and a thickest portion of separator core 4C illustrated in FIG. 6 is formed thicker than separator core 4A illustrated in FIG. 4. Separators 2A, 2B, 2C illustrated in these figures have the same structure of separator frame 3A, and separator cores 4A, 4B, 4C having different thicknesses are respectively inserted with respect to separator frames 3A having the same structure, so that depth (h) of battery housing 50 is adjusted, and battery cells 1 having different thicknesses (d) can be ideally stacked.

It is possible to change the thickness of separator core 4 by using a plate material molded to have a predetermined thickness as illustrated in FIGS. 4 and 5, or by stacking spacer 4b on the surface of plate body 4a molded to have a constant thickness as illustrated in FIG. 6. Separator core 4C illustrated in FIG. 6 is made thicker than separator core 4A by attaching thinly formed spacer 4b to the surface of separator core 4A illustrated in FIG. 4. With this structure, it is possible to easily adjust the thickness of separator core 4. As such spacer 4b, a plate material or a sheet material excellent in heat resistance or thermal insulation, for example, a plate material made of resin or non-combustible paper, a fiber sheet carrying powder having high heat insulation such as silica aerogel, or the like can be used. Accordingly, in the structure in which the thickness of separator core 4 is adjusted by the plate material or the sheet material stacked on the surface, its characteristics can be added by stacking a sheet material or a plate material having optimum characteristics according to characteristics of battery cell 1.

Furthermore, in separator core 4C illustrated in FIG. 6, an outer peripheral portion of an opposed surface opposed to battery cell 1 as contact portion 44 is in close contact with an outer peripheral portion of main surface 1A of battery cell 1, and central concave portion 45 depressed in a concave shape is provided at a central portion of the opposed surface. This separator core 4C is configured in a manner such that central concave portion 45 can absorb a swelling (=bulge) of battery cell 1 which expands due to charging.

Furthermore, separator core 4C in FIG. 6 is provided with non-contact portion 46 that does not come into contact with opposed main surface 1A of battery cell 1 along an outer peripheral edge of the surface opposed to battery cell 1. Separator core 4C illustrated in the figure is provided with non-contact portions 46 along an upper end, a lower end, and both side edges opposed to four sides of main surface 1A of battery cell 1. Non-contact portion 46 is formed by forming a step portion that is formed outside contact portion 44 to be one step lower at an outer peripheral edge of separator core 4C. In this separator 2C, it is possible to prevent damage or deformation of an end of battery cell 1 when outer peripheral edges of adjacent battery cells 1 are strongly pressed in a state in which battery stack 9 is fastened in the stacking direction and strongly sandwiched from both end faces. However, the separator core can be provided with a non-contact portion only in a region opposed to the upper end and/or the lower end of the battery cell.

In separator core 4C illustrated in FIG. 6, spacer 4b molded into a thin ring shape is attached to the surface of rectangular plate body 4a that fits main surface 1A of battery cell 1 so that a thickest portion of separator core 4C is made thicker, and contact portion 44 that comes into contact with main surface 1A of battery cell 1, central concave portion 45 formed at a central portion, and non-contact portion 46 formed along an outer peripheral edge are provided at a surface opposed to battery cell 1. In this structure, it is possible to easily form contact portion 44, central concave portion 45, or non-contact portion 46 having desired shapes according to battery cell 1 by variously changing the shape of spacer 4b. However, the separator core can be integrally molded with resin in a shape having a contact portion, a central concave portion, or a non-contact portion at a surface opposed to the battery cell.

Although separator core 4C in FIG. 6 is provided with one central concave portion 45 depressed in a concave shape at a central portion, the separator core can also include a plurality of holes at the surface. The plurality of holes can be provided in a predetermined arrangement. The holes may be formed not only uniformly on the entire surface of the separator but also partially. The plurality of holes may be provided so as to have a uniform density, or may be provided so as to have a density increased at a central portion of the separator. This is because further thermal insulation is exerted when thermal runaway arises in the battery cells. Generally, in a battery cell, a central portion of the exterior can of the battery cell expands due to thermal runaway, so that this part particularly presses the separator core and heat is easily conducted.

Therefore, by forming a large number of holes at a central portion of the separator core, the thermal insulation performance of the central portion of the separator can be improved by air insulation. Moreover, when a large number of holes are formed, it is expected that the flexibility of the separator is partially improved correspondingly, and deformation is absorbed.

Separator frame 3A in FIGS. 3 to 6 has insertion openings 31 formed at top wall 30C of separator frame 3A having a size that allows insertion of thickest separator core 4C, in order to insert separator cores 4A, 4B, 4C having different thicknesses through insertion openings 31. Moreover, separator core 4A, 4B, 4C illustrated in FIGS. 4 to 6 is provided with closing portion 41 for closing insertion opening 31 without any gap at an upper end, while protruding from both surface sides of separator core 4A, 4B, 4C. Closing portion 41 illustrated in the figures is a ridge extending in a brim shape along an upper edge of separator core 4A, 4B, 4C.

Furthermore, separator frame 3A is provided with guide portions 32 vertically extending from both ends of insertion opening 31 along inner surfaces of side walls 30B such that separator core 4A, 4B, 4C inserted from insertion opening 31 can be disposed at a fixed position in defined space 5. Plate-shaped separator core 4A, 4B, 4C has both sides that are guide ridges 42, which are slid along guide portions 32 provided at side walls 30B so as to be disposed at an intermediate portion of separator frame 3A. Guide portion 32 in FIGS. 3 to 6 is guide slit 32A that is opened vertically along a center line of side wall 30B.

Separator frame 3A illustrated in FIGS. 3 to 6 is provided with protruding pieces 30E by protruding both ends of top wall 30C outward from side walls 30B, and these protruding pieces 30E reinforce upper ends of guide slits 32A and coupling parts at both ends of insertion opening 31. To be precise, upper ends of guide slits 32A are opened and coupled to both ends of insertion opening 31, and separator core 4 is inserted into insertion opening 31 while guide ridges 42 of separator core 4A, 4B, 4C are guided to these upper end openings, so that separator core 4 is disposed at a fixed position in an intermediate portion of separator frame 3.

Furthermore, guide ridge 42 illustrated in FIGS. 3 to 6 is provided with engaging hook 47 at an upper end, so that guide ridge 42 can be coupled to separator frame 3A by an engaging structure. In separator frame 3A illustrated in FIGS. 3 to 6, engaging hook 47 is locked at an upper end of guide slit 32A and on a lower surface of protruding piece 30F, so that separator core 4A, 4B, 4C to be inserted can be coupled by an engaging structure.

Figure 7:
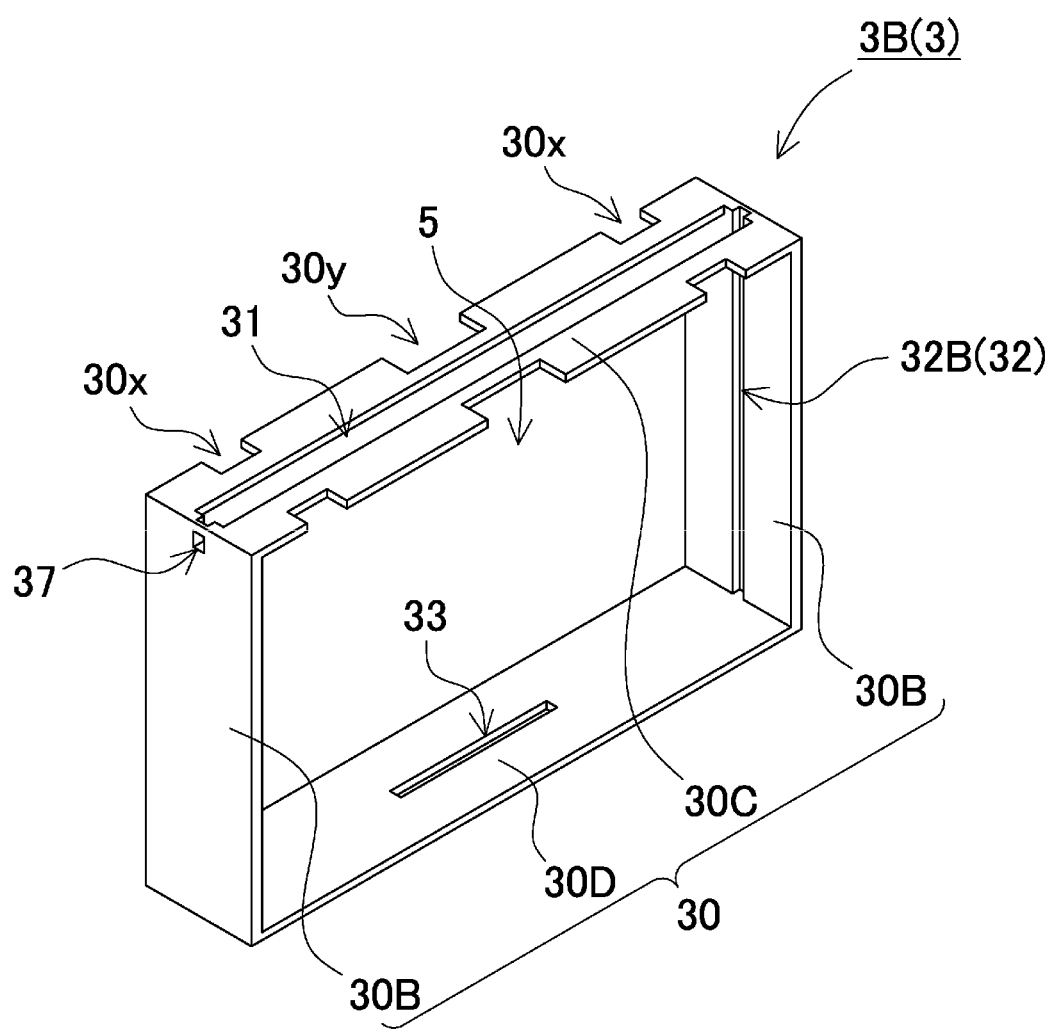
FIG. 7 is a perspective view illustrating another example of a separator frame.

However, as illustrated in FIG. 7, guide portion 32 can be guide groove 32B formed at an inner side surface along a center line of side wall 30B of separator frame 3B. In this separator frame 3B, guide ridges 42 are slid along guide grooves 32B, so that separator core 4A, 4B, 4C is inserted. Separator frame 3B illustrated in FIG. 7 is provided with engaging portions 37 that lock engaging hooks 47 at upper ends of guide grooves 32B and near opening edges at both ends of insertion opening 31. Engaging portion 37 illustrated in the figure is a through-hole that penetrates side wall 30B. In this separator frame 3B, engaging hooks 47 provided at guide ridges 42 are locked to engaging portions 37, so that separator core 4A, 4B, 4C is coupled by an engaging structure.

Furthermore, separator core 4A, 4B, 4C illustrated in FIGS. 3 to 6 is provided with insertion protrusion portion 43 that protrudes downward from a lower surface. This separator core 4A, 4B, 4C can be coupled while being positioned at a fixed position with respect to separator frame 3A, 3B by inserting insertion protrusion portion 43 into insertion portion 33 provided at bottom wall 30D of separator frame 3A, 3B.

Furthermore, in order to couple separators 2 disposed adjacent to each other at fixed positions, separator frame 3A, 3B illustrated in FIGS. 3 to 6 is provided with coupling concave portion 34 on one (a front side in the figures) of side walls 30B of separator frame 3A, 3B, and coupling protrusion portion 35 to be guided to coupling concave portion 34 is formed on the other (a rear side in the figures) of side walls 30B. These separators 2 are coupled to each other at fixed positions by guiding coupling protrusion portion 35 of one separator 2 to coupling concave portion 34 of another separator 2 in a state in which battery cell 1 is sandwiched between separators 2 adjacent to each other.

Figure 8:
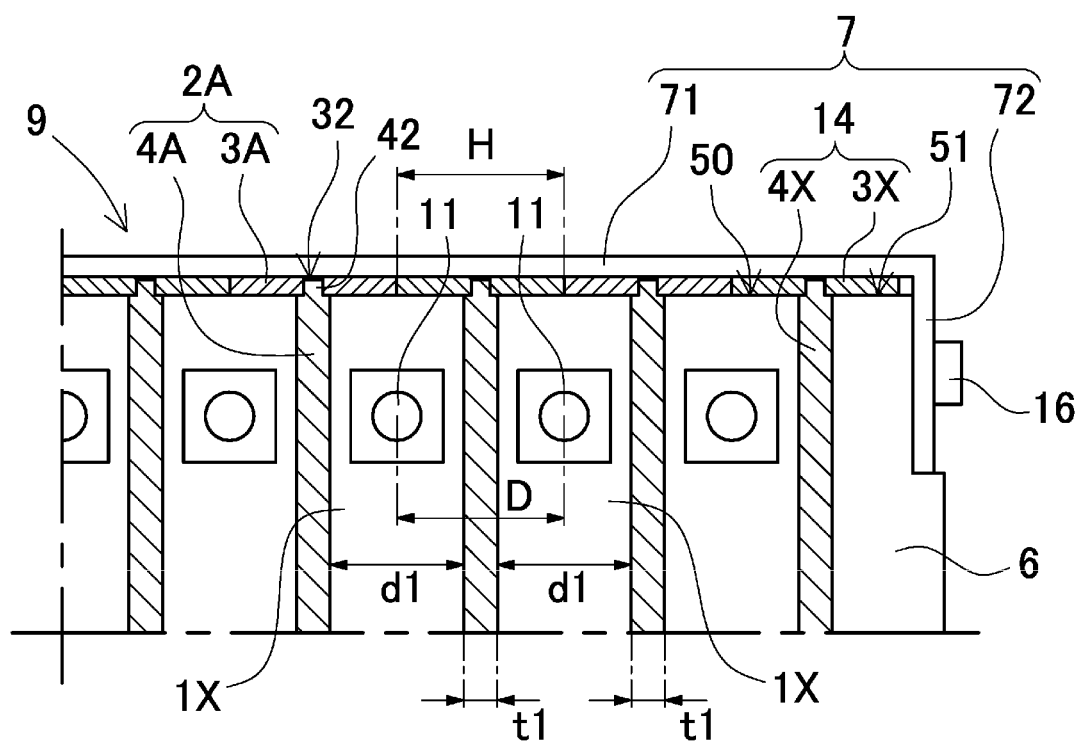
FIG. 8 is a horizontal sectional view illustrating a state in which the battery cells are stacked with the separator illustrated in FIGS. 3 and 4 interposed between the battery cells.
Figure 9:
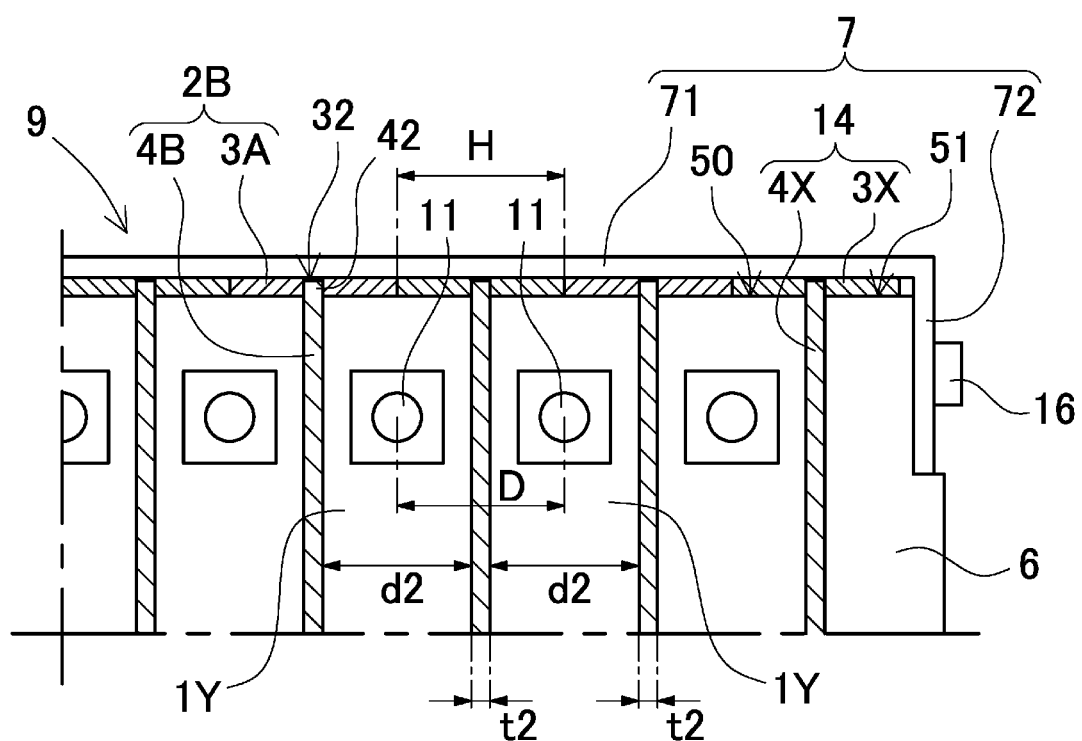
FIG. 9 is a horizontal sectional view illustrating a state in which the battery cells are stacked with the separator illustrated in FIG. 5 interposed between the battery cells.
Figure 10:
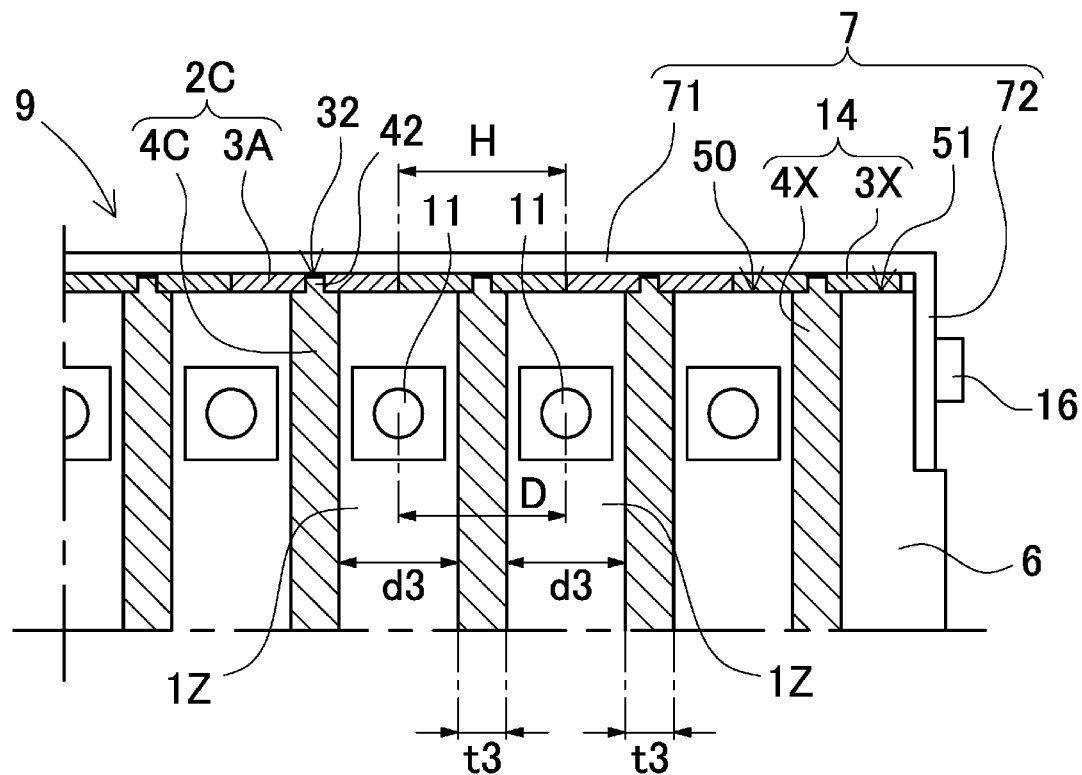
FIG. 10 is a horizontal sectional view illustrating a state in which the battery cells are stacked with the separator illustrated in FIG. 6 interposed between the battery cells.

As described above, regarding separator 2A, 2B, 2C configured by inserting separator core 4A, 4B, 4C into defined space 5 surrounded by separator frame 3A in a frame shape, when thicknesses (d1, d2, d3) of battery cells 1 are different, thicknesses (t1, t2, t3) of separator cores 4A, 4B, 4C to be used are adjusted, so that center-to-center distance (D) of battery cells 1 to be stacked can be made constant, and width (H) of separator frame 3 can be made uniform as illustrated in FIGS. 8 to 10. On the other hand, since dimensions of closing portions 41 or insertion protrusion portions 43 of separator cores 4A, 4B, 4C are the same, same separator frame 3A can hold separator cores 4A, 4B, 4C having different thicknesses.

Regarding battery stack 9A, 9B, 9C illustrated in FIGS. 8 to 10, FIG. 9 illustrates a case where thickness (d2) of battery cell 1Y is thicker than thickness (d1) of battery cell 1X illustrated in FIG. 8, and FIG. 10 illustrates a case where thickness (d3) of battery cell 1Z is thinner than thickness (d1) of battery cell 1 illustrated in FIG. 8. Regarding separator 2 illustrated in these figures, thickness (t) of separator core 4 is specified to be a difference between thickness (d) of battery cell 1 to be used and desired inter-cell distance (D) of battery cells 1 stacked on each other, that is, to satisfy t=D−d, so that a plurality of stacked battery cells 1 can be arranged at predetermined interval (D). Thus, even in a case where thickness (d) of battery cell 1 to be used is different for each power supply device 100 depending on the specifications of power supply device 100, it is possible to make center-to-center distance (D) of battery cells 1 constant by selecting thickness (t) of separator core 4 according to thickness (d) of battery cell 1.

Therefore, bus bars 13 having the same standard can be used as a bus bar for connecting electrode terminals of adjacent battery cells 1, and it is possible to reduce the manufacturing cost by unifying bus bars 13 without individually designing bus bar 13 for each power supply device. Moreover, since the center-to-center distance of battery cells 1 can be made constant, it is possible to make the total length of the entire power supply device constant between power supply devices 100 having the same number of battery cells 1 to be stacked. Therefore, it is possible to reduce the manufacturing cost by unifying external members such as bind bar 7 to be coupled to a side surface of battery stack 9 or gas discharge duct 15 to be disposed on an upper surface side of battery stack 9 as external members of power supply device 100 without individually designing the external members.

Furthermore, separator 2 illustrated in FIGS. 8 to 10 is specified such that width (H) of separator frame 3 becomes the sum of thickness (t) of separator core 4 and thickness (d) of battery cell 1 to be used, that is, H=d+t is satisfied. As a result, the entire outer peripheral surfaces of a plurality of battery cells 1 stacked on each other can be covered with peripheral wall 30 of separator frame 3.

Furthermore, in separator 2 according to the present exemplary embodiment, since separator core 4 can be exchanged with respect to separator frame 3, it is possible to variously change separator core 4 in consideration of a material or a function of the battery cell not only according to thickness (d) of battery cell 1 to be used but also according to a type or a capacity of battery cell 1. Moreover, as illustrated in the figure, regarding battery stack 9 in which a plurality of battery cells 1 are stacked, it is also possible to change separator core 4 to be sandwiched between battery cells 1 according to the stacked position, that is, according to a region of battery stack 9 where a large number of battery cells 1 are stacked.

COUPLING EXAMPLE 2

Furthermore, the separator can have a structure in which a separator core is inserted with respect to the separator frame in the right-left direction, which will be described in detail later. In this case, in the separator frame, a side wall can be provided with an insertion opening for the separator core, and inner surfaces of a top wall and a bottom wall can be provided with guide portions for guiding an upper end and a lower end of the separator core that serve as guide ridges. In this separator, it is also possible to make center-to-center distance (D) of battery cells to be stacked constant by selecting the thickness of the separator core according to the thickness of the battery cell to be used depending on the specifications of the power supply device.

COUPLING EXAMPLE 3

(Separator 2D, 2E)

Figure 11:
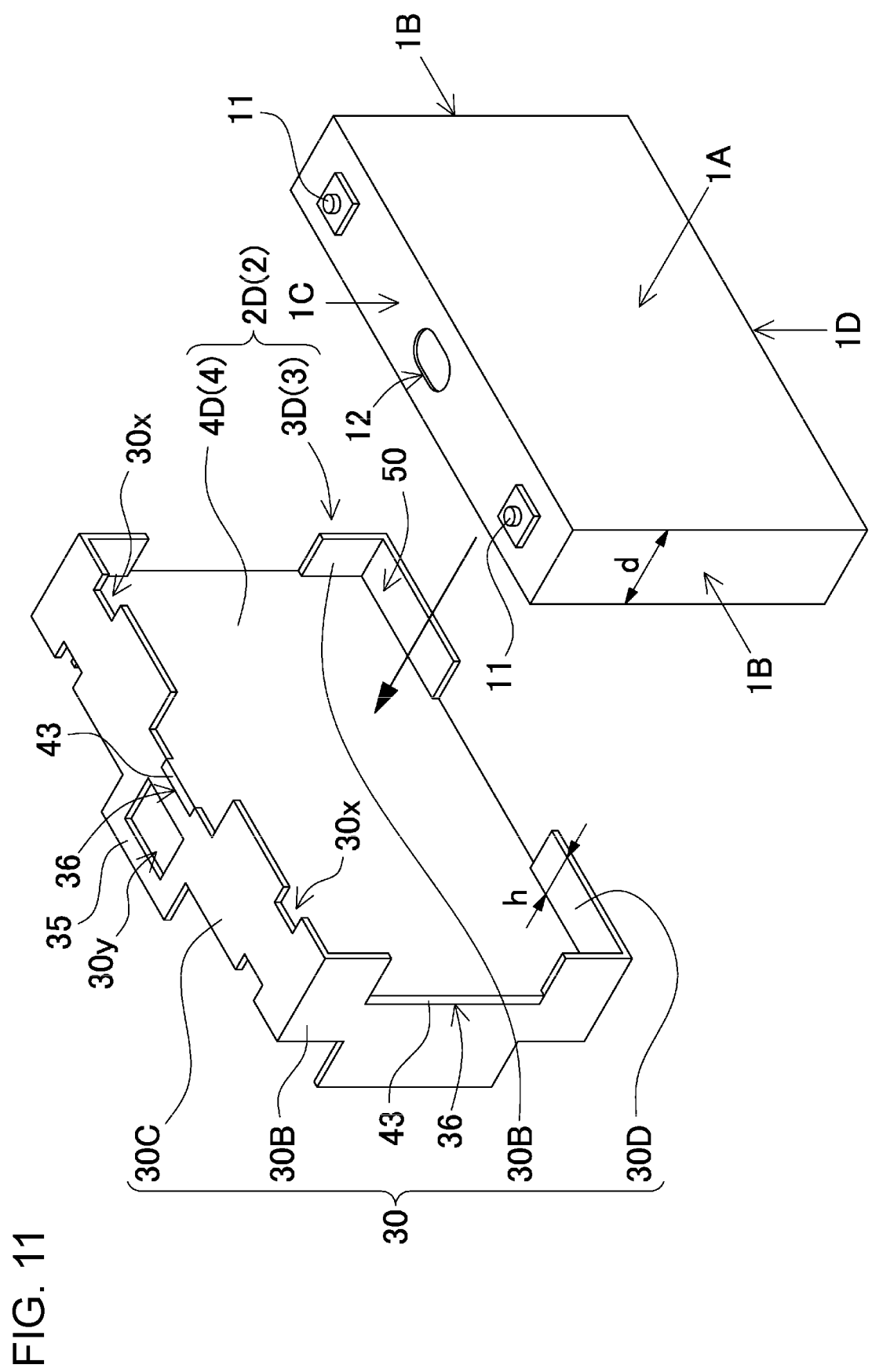
FIG. 11 is a perspective view illustrating another example of the separator.
Figure 12:
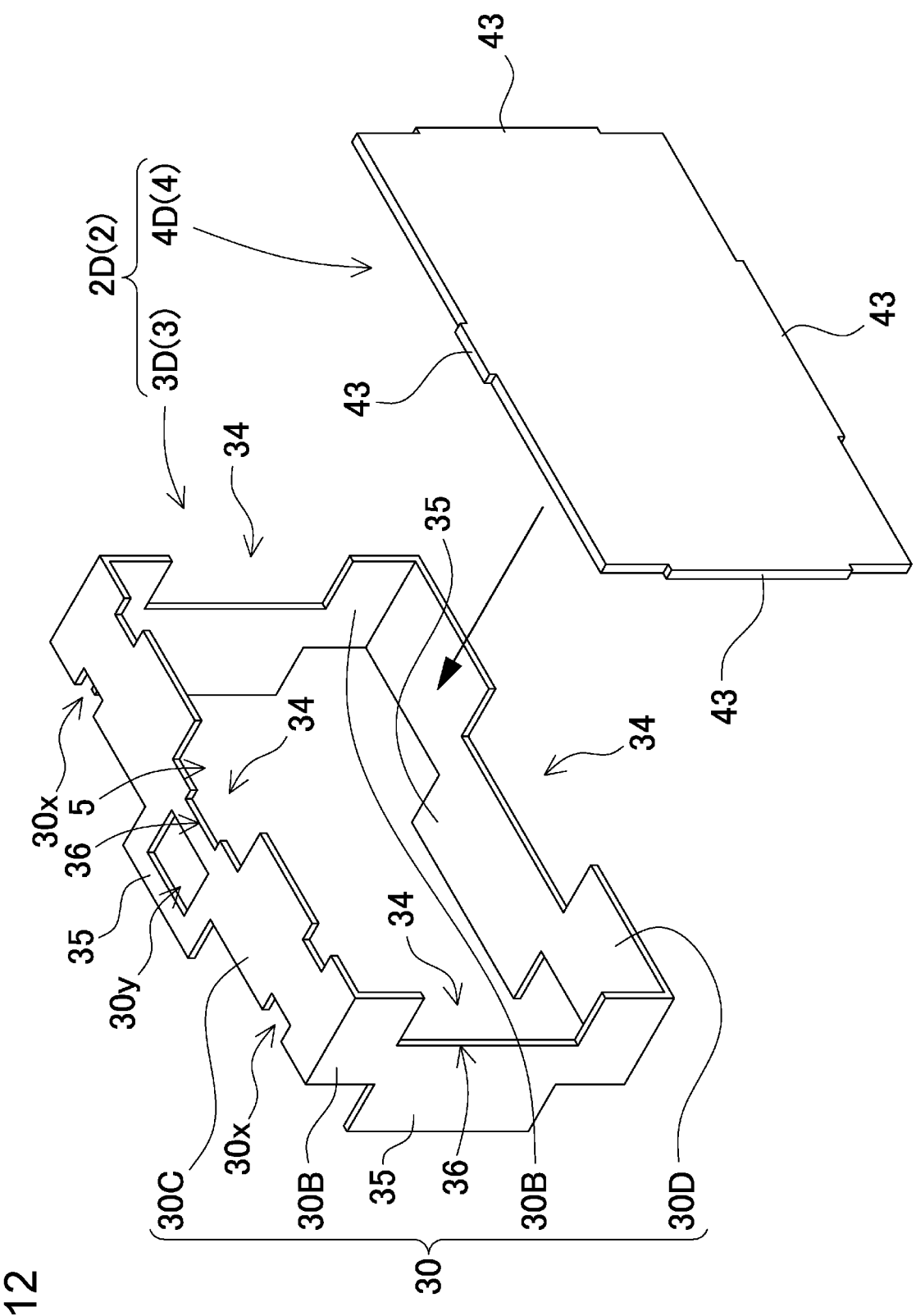
FIG. 12 is an exploded perspective view of the separator illustrated in FIG. 11.
Figure 13:
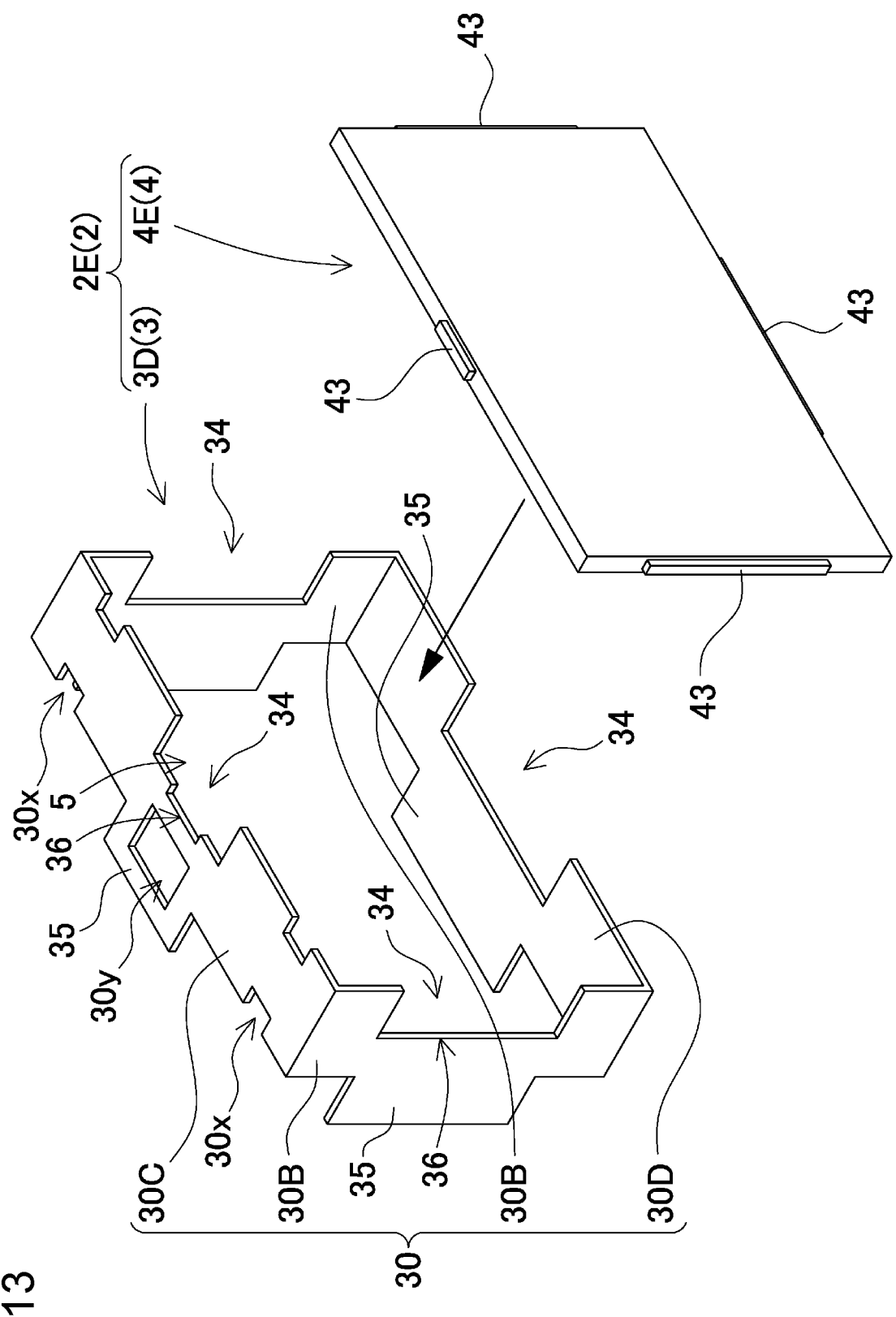
FIG. 13 is an exploded perspective view illustrating another example of the separator.

Furthermore, separator 2D, 2E illustrated in FIGS. 11 to 13 has a structure in which separator core 4D, 4E is inserted with respect to separator frame 3D in the front-rear direction and is coupled. Separator 2D, 2E illustrated in FIGS. 12 and 13 represents a state in which separator core 4D, 4E is inserted with respect to separator frame 3D from the front, and separator core 4D, 4E is disposed inside separator frame 3D. In this separator 2D, 2E, an outer shape of separator core 4D, 4E opposed to main surface 1A of battery cell 1 is substantially the same as an inner shape of peripheral wall 30 of separator frame 3D, so that separator core 4D, 4E can be disposed without any gap with respect to separator frame 3D. Furthermore, separator 2D, 2E illustrated in FIGS. 12 and 13 is provided with insertion protrusion portions 43 that protrude outward from four sides of separator core 4D, 4E, and insertion concave portions 36 for guiding these insertion protrusion portions 43 at four sides of separator frame 3D, in order to dispose separator core 4D, 4E inserted inside separator frame 3D at a fixed position. This separator 2D, 2E has a structure in which insertion protrusion portions 43 that protrude from outer peripheral surfaces of separator cores 4D, 4E are guided to insertion concave portions 36 provided at peripheral wall 30 of separator frame 3D, so that separator core 4D, 4E is coupled at a fixed position of separator frame 3D.

Here, separator 2D, 2E illustrated in FIGS. 12 and 13 is provided with coupling concave portions 34 on one side (a front side in the figures) of peripheral wall 30 of separator frame 3D, and is provided with coupling protrusion portions 35 to be guided to coupling concave portions 34 on the other side (a rear side in the figures), in order to couple adjacent separators 2 to each other at fixed positions as described above. Separator 2D, 2E in the figures is provided with coupling concave portions 34 at central portions on a front side of a pair of side walls 30B, bottom wall 30D, and top wall 30C, and is provided with coupling protrusion portions 35 to be inserted into coupling concave portions 34 at central portions on the rear side. In separator frame 3D illustrated in the figures, coupling concave portions 34 provided at a pair of side walls 30B and bottom wall 30D are formed deeply, so that insertion concave portions 36 into which insertion protrusion portions 43 provided at both side surfaces and a bottom surface of separator core 4D, 4E are inserted are formed. This structure is characterized in that the total length of insertion protrusion portions 43 to be coupled to both side walls 30B and bottom wall 30D of separator frame 3 can be increased. Moreover, in separator frame 3D illustrated in the figures, insertion concave portion 36 formed to be shorter than coupling concave portions 34 is formed at a bottom of coupling concave portion 34 provided at top wall 30C. Thus, insertion concave portion 36 formed at a bottom of coupling concave portion 34 of separator frame 3D can have a total length shorter than coupling concave portion 34. A plurality of insertion concave portions to be formed shorter than coupling concave portions 34 may be provided. As a result, the separator core can be stably coupled at a fixed position. It is to be noted that separator frame 3D illustrated in the figures is provided with opening 30y that exposes gas discharge portion 12 of battery cell 1 at coupling protrusion portion 35 that protrudes rearward from top wall 30C and in a region of a central portion of top wall 30C.

Separator cores 4D, 4E illustrated in FIGS. 11 to 13 have different thicknesses. Specifically, separator core 4E illustrated in FIG. 13 is molded thicker than separator core 4D illustrated in FIG. 12. These separators 2D, 2E have the same structure of separator frame 3D, and separator cores 4D, 4E having different thicknesses are inserted with respect to separator frames 3D having the same structure, so that depth (h) of battery housing 50 is adjusted, and battery cells 1 having different thicknesses (d) can be ideally stacked. Accordingly, in these separators 2D, 2E, it is also possible to make center-to-center distance (D) of battery cells 1 to be stacked constant by changing thickness (t) of separator core 4 according to thickness (d) of battery cell 1 to be used depending on the specifications of power supply device 100. On the other hand, dimensions of insertion protrusion portions 43 of separator core 4D, 4E are the same according to positions where protrusion portions 43 are provided, so that same separator frame 3D can hold separator cores 4D, 4E having different thicknesses.

COUPLING EXAMPLE 4

(Separator 2F)

Figure 14:
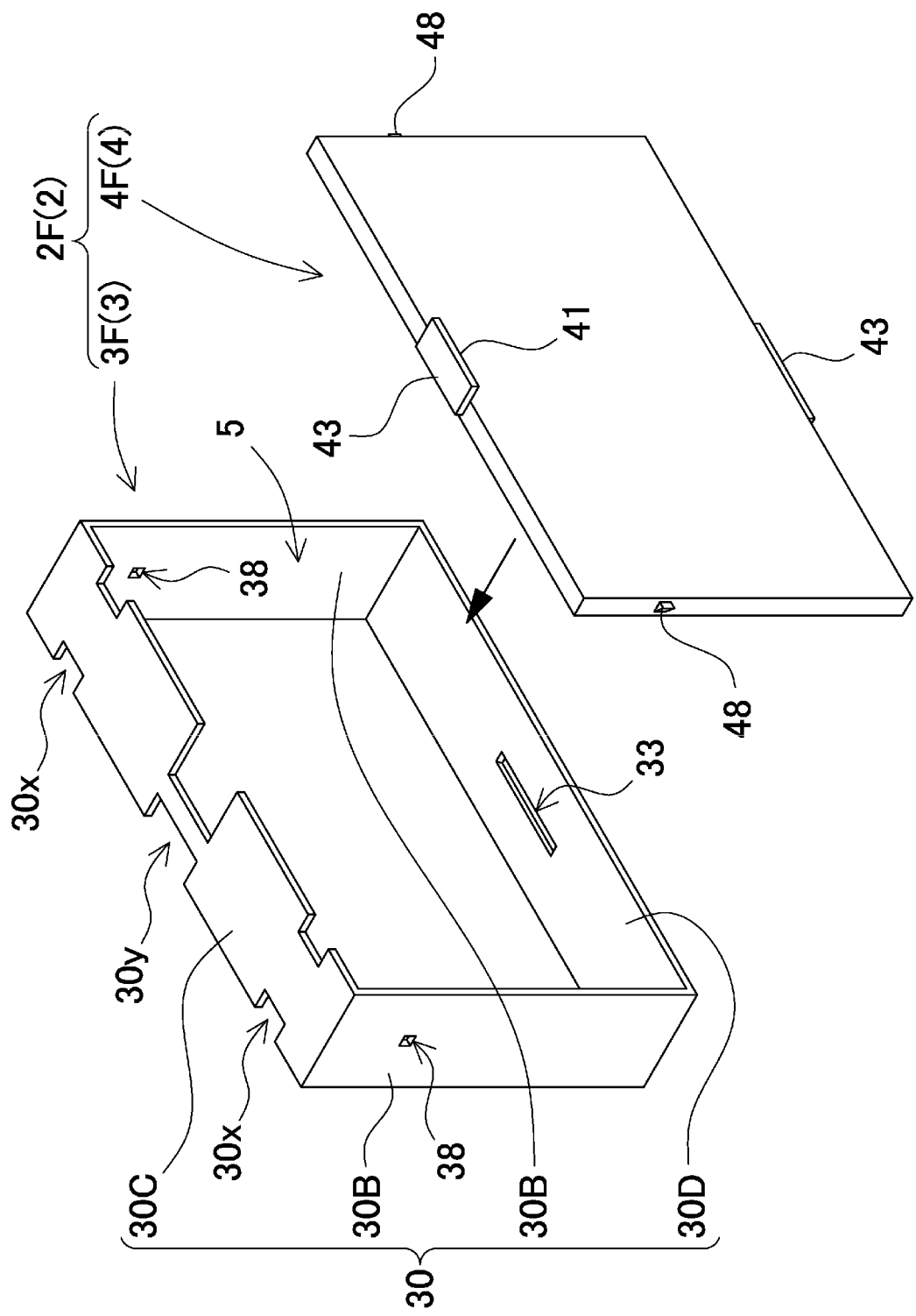
FIG. 14 is an exploded perspective view illustrating another example of the separator.
Figure 15:
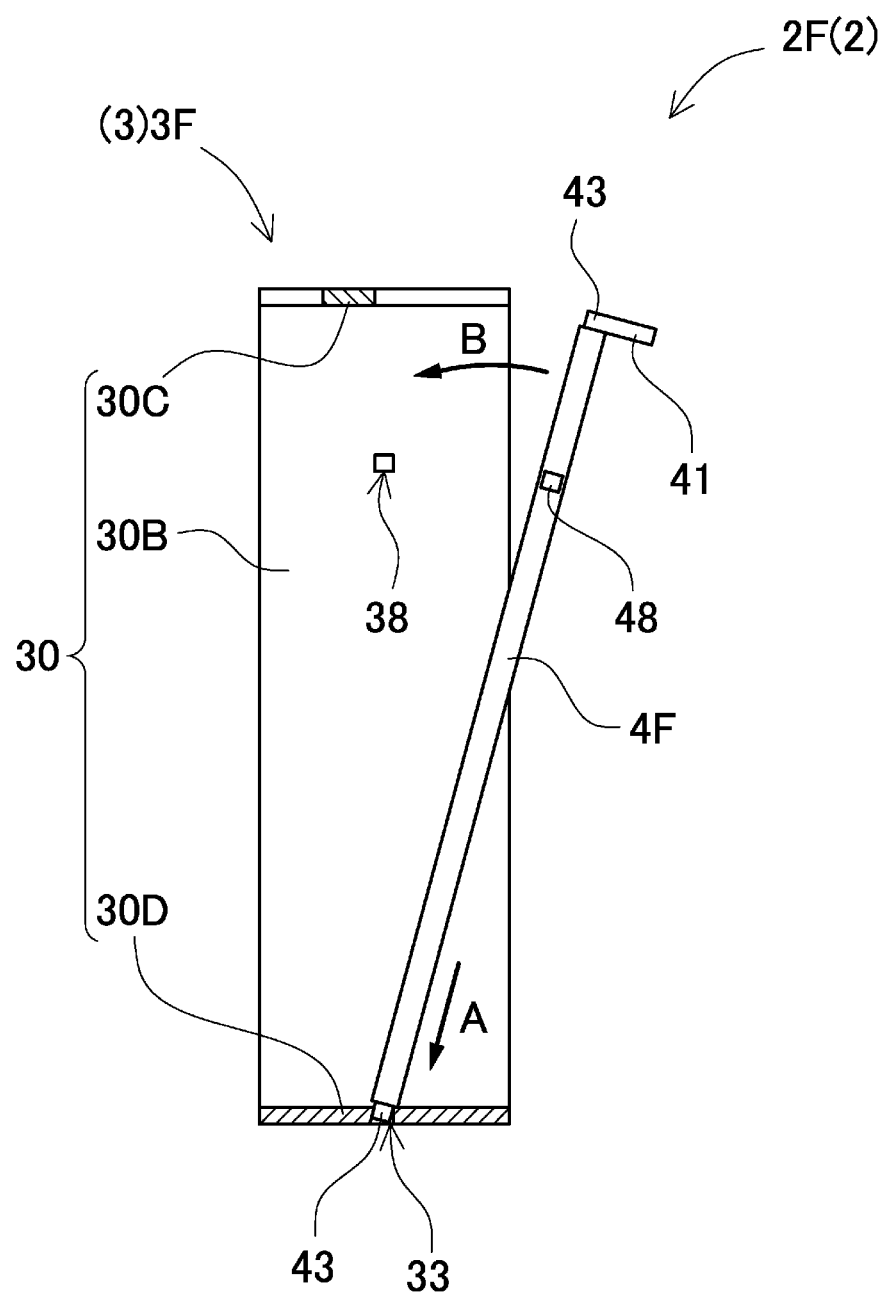
FIG. 15 is a sectional view illustrating a coupling structure of the separator illustrated in FIG. 14.

Furthermore, separator 2F illustrated in FIGS. 14 and 15 has a structure in which rectangular separator core 4F is press-fitted with respect to frame-shaped separator frame 3F. FIG. 15 illustrates a state in which separator core 4F is inserted with respect to separator frame 3F obliquely from above and is press-fitted into the inside of separator frame 3F. In this separator 2F, an outer shape of separator core 4F opposed to main surface 1A of battery cell 1 is made substantially the same as an inner shape of peripheral wall 30 of separator frame 3F, so that separator core 4F can be disposed without any gap with respect to separator frame 3F.

Furthermore, separator 2F illustrated in FIGS. 14 and 15 is provided with insertion protrusion portion 43 that protrudes downward from a lower surface of separator core 4F, and insertion concave portion 33 for guiding this insertion protrusion portion 43 at bottom wall 30D of separator frame 3. Moreover, separator 2F illustrated in the figures is provided with engaging protrusion portions 48 that protrude outward from both side surfaces of separator core 4F, and engaging portions 38 for guiding these engaging protrusion portions 48 at inner surfaces of side walls 30B of separator frame 3F. Engaging protrusion portion 48 illustrated in the figures is an inclined protrusion portion having an inclined surface that is inclined toward a press-fitting direction of separator core 4F. Moreover, engaging portion 38 illustrated in the figures is an engaging hole that penetrates side wall 30B. However, each engaging protrusion portion can be a curved protrusion portion having a curved surface, for example, a spherical surface, and each engaging portion can be an engaging concave portion that can guide an engaging protrusion portion.

In above separator 2F, as illustrated in FIG. 15, separator core 4F is inserted along inner surfaces of side walls 30B of separator frame 3F, insertion protrusion portion 43 that protrudes from a lower surface of separator core 4F is inserted into insertion portion 33 provided at bottom wall 30D of separator frame 3F as indicated by arrow A in the figure and is press-fitted along inner surfaces of side walls 30B with separator core 4F inclined as indicated by arrow B in the figure, and engaging protrusion portions 48 that protrude from both side surfaces are guided to engaging portions 38 provided at side walls 30B of separator frame 3F, so that separator core 4F is coupled at a fixed portion of separator frame 3F.

Furthermore, separator 2F in FIG. 14 guides insertion protrusion portion 43 that protrudes from an upper surface of separator core 4F to insertion concave portion 36 provided at top wall 30C of separator frame 3F, so as to position the upper surface side of separator core 4F. Furthermore, in separator 2F in the figure, insertion protrusion portion 43 that protrudes from the upper surface is protruded frontward in the figure so as to provide closing portion 41. In this separator 2F, closing portion 41 closes a bottom portion of insertion concave portion 36 in a state in which insertion protrusion portion 43 is guided to insertion concave portion 36 provided on a front side of top wall 30C, so that opening 30y that exposes gas discharge portion 12 is formed on an opening side of insertion concave portion 36. Although not shown, the separator can be provided with an engaging protrusion portion at an upper surface of the separator core, and is provided with an engaging portion that guides this engaging protrusion portion at an inner surface of the upper wall, so as to position an upper surface side of the separator core.

In above separator 2F, it is also possible to make center-to-center distance (D) of stacked battery cells 1 constant by changing thickness (t) of separator core 4F according to thickness (d) of battery cell 1 to be used depending on the specifications of power supply device 100.

(Battery stack 9)

As described above, separators 2 in which separator cores 4 are disposed at fixed positions in intermediate portions of separator frames 3 are stacked on each other in a state in which battery cells 1 are guided to battery housings 50 formed on both surfaces. As illustrated in FIG. 2, a plurality of rectangular battery cells 1 and a plurality of separators 2 are alternately stacked in the thickness direction of battery cells 1 to form battery stack 9. A plurality of battery cells 1 are stacked in a manner such that top surfaces 1C provided with electrode terminals are located on the same plane, and outer surfaces 1B on both sides are located on the same planes.

As illustrated in FIG. 2, in battery stack 9, bus bars 13 of metal sheets are connected with positive and negative electrode terminals 11 of adjacent battery cells 1, and a plurality of battery cells 1 are connected in a predetermined arrangement. In power supply device 100, adjacent battery cells 1 can be connected in series with each other to increase an output voltage so as to increase an output, and adjacent battery cells 1 can be connected in parallel to increase a charged/discharged current. In battery stack 9 illustrated in FIG. 2, twelve battery cells 1 are stacked on each other, and these battery cells 1 are connected in two parallel two series connection. However, the present invention does not specify a number of battery cells 1 that constitute the battery stack, and a connection state of the battery cells.

(End Separator 14)

In power supply device 100 in FIG. 2, end plates 6 are disposed outside battery cells 1 disposed at both ends of battery stack 9 with end separators 14 being interposed. As illustrated in FIGS. 8 to 10, end separator 14 is stacked between battery cell 1 and end plate 6 disposed at both ends of battery stack 9 so as to insulate battery cell 1 and end plate 6 from each other. That is, in order to insulate metal end plate 6 and battery cell 1 from each other at both ends of battery stack 9, end separator 14 having an insulating property is interposed between battery cell 1 and end plate 6. Similar to separator 2, this end separator 14 is made of an insulating material such as a plastic. In this structure, end plates 6 are made of metal, and battery cells 1 each having a battery case made of metal can be insulated by end separators 14 having an insulating property and be stacked.

This end separator 14 has the same structure as a structure of separator 2 described above, that is, has a structure including separator frame 3X that forms defined space 5 surrounded in a frame shape, and separator core 4X that is inserted into defined space 5 surrounded by separator frame 3X. In this end separator 14, battery cell 1 to be stacked at an end of battery stack 9 is inserted into one battery housing 50 of defined space 5 divided by separator core 4X, and another housing 51 houses end plate 6. In this end separator 14, it is also possible to appropriately select separator core 4X to be coupled to separator frame 3X according to a size or characteristics of battery cells 1 stacked as battery stack 9. As illustrated in FIGS. 8 to 10, end separator 14 includes separator core 4X having a size substantially equal to a size of main surface 1A of battery cell 1 and end plate 6, and this separator core 4X is stacked between and insulate battery cell 1 and end plate 6. Regarding this end separator 14, it is also possible to adjust an interval between battery cell 1 and end plate 6 to be disposed at each end of battery stack 9 by adjusting a thickness of separator core 4X according to thickness of battery cell 1 to be stacked as with separator 2 described above.

(End Plate 6)

End plates 6 are disposed at both ends of battery stack 9. End plates 6 are coupled to bind bars 7, pressurize battery stack 9 from both end faces, and fix each battery cell 1 of battery stack 9 in a pressurized state with a predetermined tightening pressure. An outer shape of end plate 6 is substantially the same as an outer shape of battery cell 1, and is a rectangular plate shape that is not deformed by coupling bind bars 7 to both sides and fixing battery stack 9 in a pressurized state. End plates 6 are coupled to bind bars 7 on both sides to be in close contact with the surfaces of battery cells 1 in a surface contact state, and fix battery cells 1 in a pressurized state with a uniform pressure.

(Bind Bar 7)

As illustrated in FIGS. 1 and 2, bind bars 7 are disposed on both side surfaces of battery stack 9, and couple end plates 6 at both ends of battery stack 9, so as to fix a plurality of battery cells 1 in the stacking direction in a pressurized state. Bind bar 7 is manufactured by pressing a metal sheet.

This bind bar 7 includes side plate 71 disposed at a side surface of battery stack 9, and fixing portions 72 disposed at both ends of this side surface plate 71 and at outer end faces of the end plates 6, and fixing portions 72 are fixed to both sides of end plates 6 via set screws 16.

Furthermore, bind bar 7 is provided with opening 70 inside side plate 71 excluding an outer peripheral edge. This reduces weight of bind bar 7, and reduces the amount of metal to be used and reduces the manufacturing cost. In bind bar 7 in the figures, rectangular peripheral plate 71A is provided at an outer peripheral edge of side surface plate 71, and the inside of peripheral edge plate 71A is opening 70. In side surface plate 71 illustrated in FIGS. 1 and 2, an intermediate portion of rectangular peripheral edge plate 71A is vertically coupled by coupling bar 71B so that peripheral edge plate 71A is reinforced by coupling bar 71B, while a plurality of sectioned openings 70 are provided inside peripheral edge plate 71A.

SECOND EXEMPLARY EMBODIMENT

Figure 16:
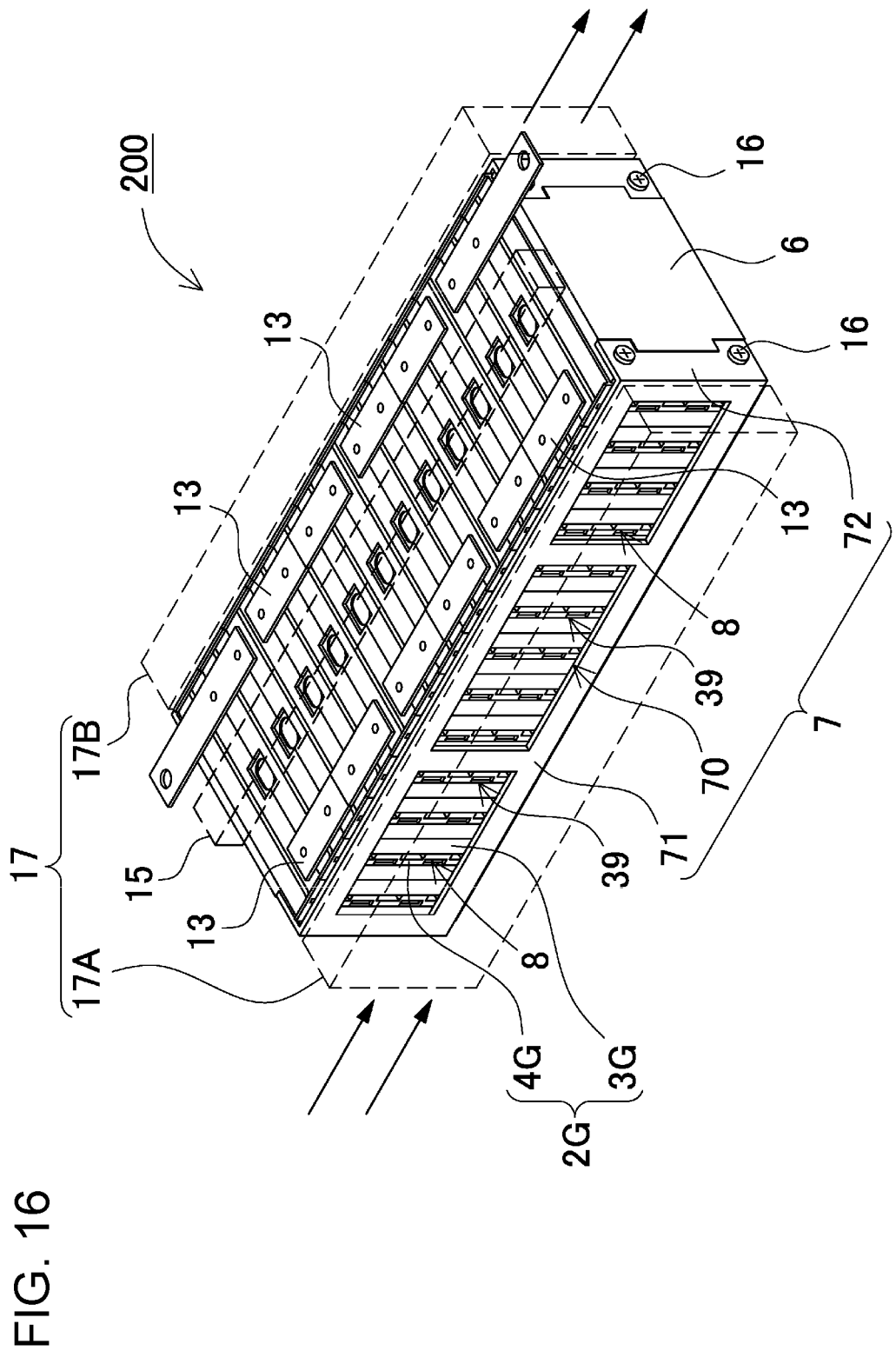
FIG. 16 is a perspective view of a power supply device according to a second exemplary embodiment of the present invention.

Furthermore, power supply device 200 according to a second exemplary embodiment of the present invention is illustrated in a perspective view of FIG. 16. Power supply device 200 illustrated in this figure includes a plurality of rectangular battery cells 1 stacked in a thickness direction, and separators 2G, 2H that are interposed between battery cells 1 adjacent to each other and form cooling gaps 8 between the separators and battery cells 1. In this power supply device 200, a plurality of battery cells 1 and separators 2 are alternately stacked to form battery stack 9, and a pair of end plates 6 are disposed at both ends of this battery stack 9 and are fastened by bind bars 7 disposed on both sides of battery stack 9. Furthermore, power supply device 200 includes air flow ducts 17 on both sides of battery stack 9, and a cooling gas is forced to flow into cooling gaps 8 through these air flow ducts 17 so as to cool battery cells 1 that constitute battery stack 9. In this power supply device 200, it is to be noted that the same configuration elements as configuration elements of the first exemplary embodiment described above can be employed for members other than separators 2 and air flow ducts 17, and the same reference numerals are given in FIG. 16 and the detailed description is omitted.

(Separator 2G, 2H)

Figure 17:
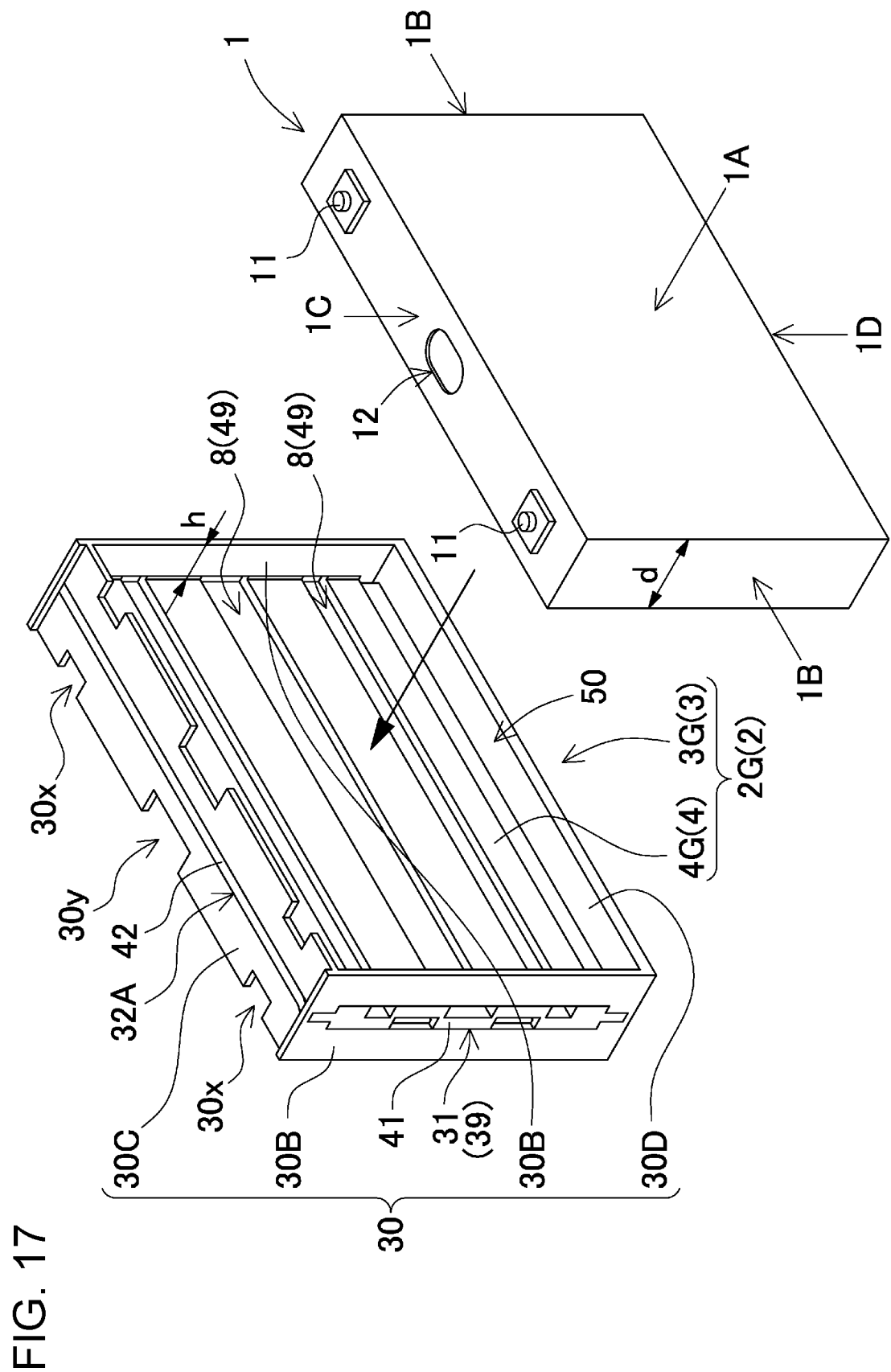
FIG. 17 is a perspective view of a separator and a battery cell of the power supply device illustrated in FIG. 16.
Figure 18:
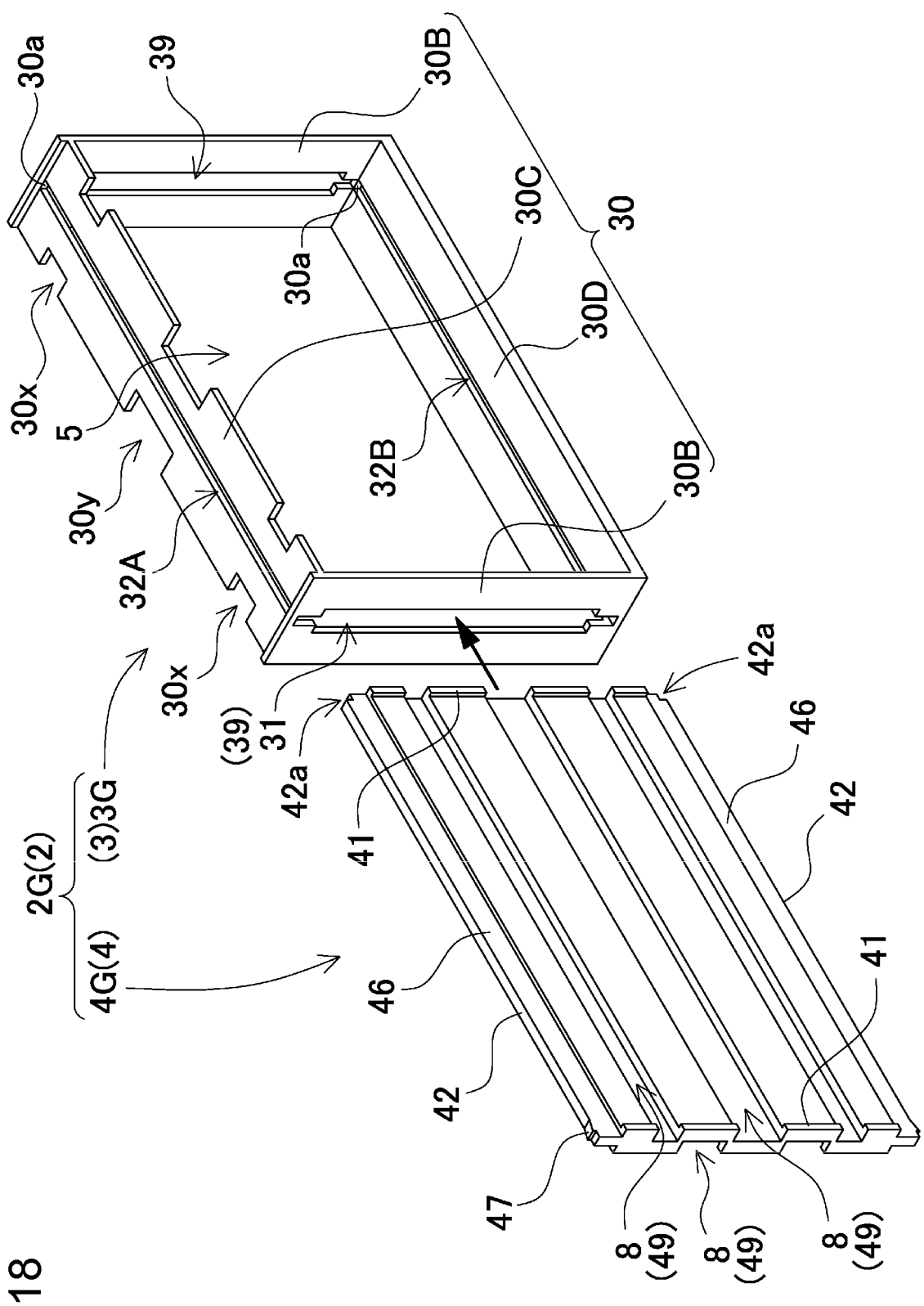
FIG. 18 is an exploded perspective view of the separator illustrated in FIG. 17.
Figure 19:
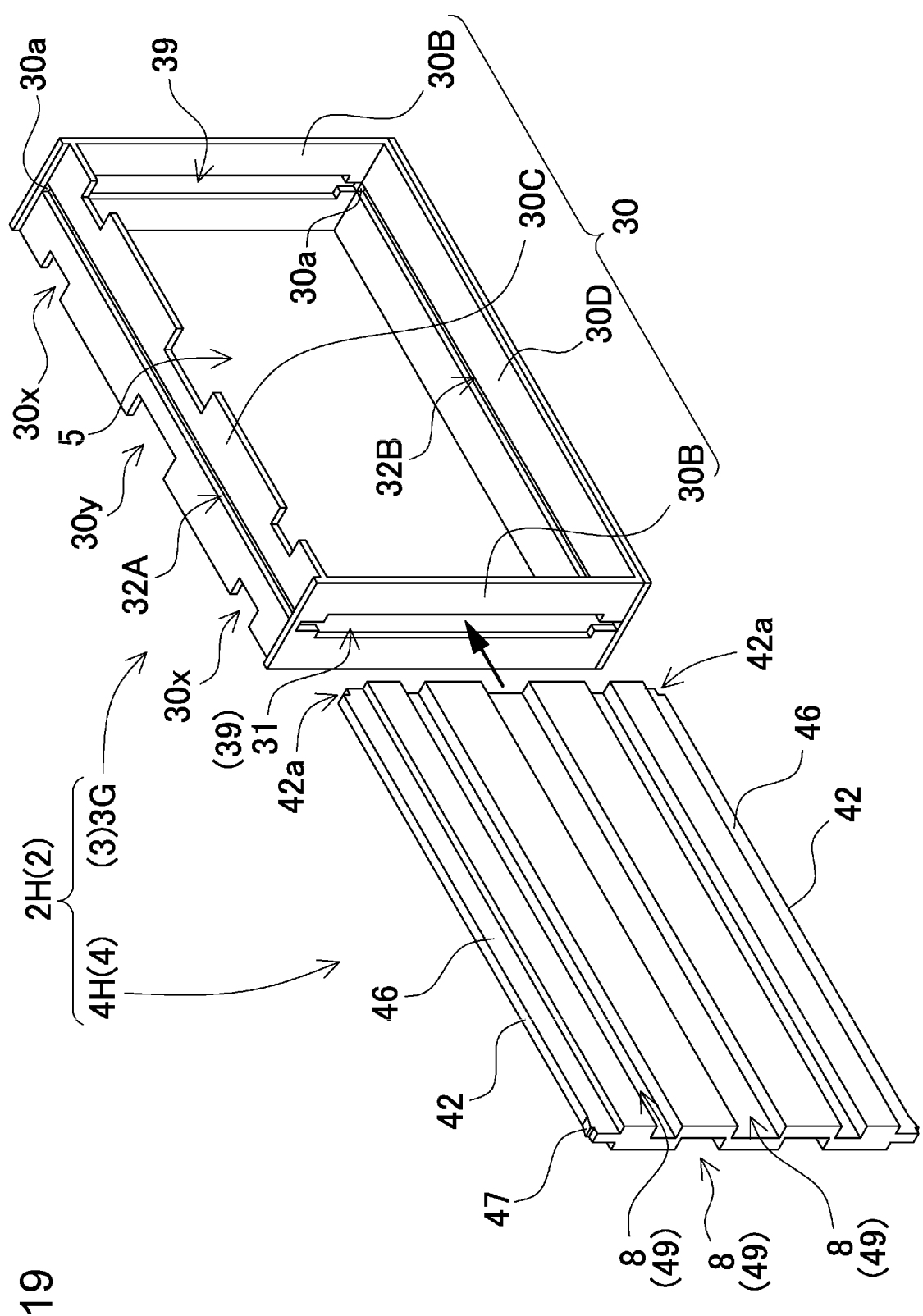
FIG. 19 is an exploded perspective view illustrating another example of the separator.

Separator 2G, 2H illustrated in FIGS. 17 to 19 is provided with cooling gaps 8, through which a cooling gas such as air flows, at separator core 4G, 4H sandwiched between the separator and battery cell 1 in order to effectively cool battery cell 1. Separator core 4G, 4H of separator 2G, 2H illustrated in FIGS. 18 and 19 is molded to have a zigzag-shape cross section, and a plurality of rows of cooling gaps 8 extending in the right-left direction are provided in parallel with each other between the separator core and main surface 1A that is the surface of opposed battery cell 1. Both ends of cooling gaps 8 are opened at both side surfaces of battery stack 9, and a cooling gas supplied from one side is discharged to the other side to cool battery cell 1.

This separator 2G, 2H is provided with a plurality of rows of grooves 49 at separator core 4G, 4H, and cooling gaps 8 are provided between battery cell 1 and separator core 4G, 4H. In separator core 4G, 4H in the figures, a plurality of grooves 49 are provided in parallel with each other at predetermined intervals. Separator core 4G, 4H in the figures is provided with grooves 49 on both surfaces, and a plurality of rows of cooling gaps 8 are provided between battery cell 1 and separator core 4G, 4H that are adjacent to each other. With this structure, it is possible to effectively cool battery cells 1 stacked on both surfaces with a cooling gas caused to flow into cooling gaps 8 formed at both surfaces of separator core 4G, 4H. However, a separator core may be provided with grooves only on one surface so as to provide cooling gaps between a battery cell and the separator core. Furthermore, this separator 2G, 2H is provided with air flow openings 39 for flowing a cooling gas into cooling gaps 8 at side walls 30B on both sides of separator frame 3G.

Separator 2G, 2H illustrated in FIGS. 17 to 19 has a structure in which separator core 4G, 4H is inserted with respect to separator frame 3G in the right-left direction. Separator frame 3G in the figure has insertion opening 31 for separator core 4G, 4H at one side wall 30B (left side wall 30B in the figures). Separator frame 3G in the figures has a slit extending vertically in side wall 30B, and this slit functions as insertion opening 31 having a shape and a size that allow separator core 4G, 4H to pass through. Moreover, separator frame 3G has a slit extending vertically also at opposed side wall 30B (right side wall 30B in the figures), and this slit has a shape and a size that allow a front end of separator core 4G, 4H to be inserted but do not allow the entire separator core to pass through. As a result, a pair of slits opened at both side walls 30B of separator frame 3G also serve as air flow openings 39 for flowing a cooling gas into cooling gaps 8.

In separator frame 3G in FIGS. 18 and 19, insertion opening 31 formed at side wall 30B has a size that allows insertion of thickest separator core 4H, in order to insert separator cores 4G, 4H having different thicknesses through insertion opening 31. Moreover, separator core 4G illustrated in FIG. 18 is provided with closing portions 41 for closing insertion openings 31 without any gap, the closing portions protruding toward both surface sides from both ends of the separator core. Closing portions 41 illustrated in the figure are provided as ridges extending in a brim shape at both end edges of separator core 4G and at a part excluding grooves 49.

In separator core 4G, 4H illustrated in FIGS. 18 and 19, upper and lower ends can be inserted as guide ridges 42 along guide portions 32 provided at top wall 30C and bottom wall 30D of separator frame 3G. In guide portion 32 in the figures, guide slit 32A is provided at top wall 30C, and guide groove 32B is provided at bottom wall 30D. Guide ridges 42 illustrated in the figures have step portions 42a for positioning that are formed on upper and lower sides on a front end side in an insertion direction, and step portion 42a is put into contact with positioning unit 30a provided at opposed portion of separator frame 3G so as to specify an insertion position of separator core 4G, 4H. Moreover, guide ridges 42 illustrated in the figures are provided with engaging hooks 47 that protrude vertically on upper and lower sides on a rear end side in the insertion direction so as to prevent separator core 4G, 4H inserted into separator frame 3G from coming off.

Although a separator core that forms cooling gaps between the separator and a battery cell is inserted with respect to a separator frame in the right-left direction in the above separator, the separator core can be vertically inserted with respect to the separator frame as described above. In this case, it is necessary to expose both ends of grooves formed at the separator core from the separator frame. Accordingly, this separator has an insertion opening formed at the top wall so that the separator core is inserted from this insertion opening, while this separator has air flow openings formed at side walls on both sides so that both ends of the cooling gaps are exposed to outside from these air flow openings. This separator frame can also serve as a guide portion that guides the separator core to a fixed position by forming the air flow openings, which are formed at both side walls, in a slit shape that extends vertically.

Furthermore, separator core 4G, 4H illustrated in the figures is provided with non-contact portions 46 that do not come into contact with main surface 1A of opposed battery cell 1 along ends opposed to top surface 1C and bottom surface 1D of battery cell 1. These non-contact portions 46 are formed by thinly molding upper and lower ends of separator core 4G, 4H. Thus, by providing the non-contact portions at the upper and lower ends of separator core 4G, 4H, it is possible to prevent upper and lower ends of adjacent battery cells 1 from being strongly pressed even in a state in which battery stack 9 is fastened in the stacking direction and strongly sandwiched from both end faces. However, a separator core may be provided with a non-contact portion on only one of upper and lower sides. Furthermore, although not shown, a separator core can be provided with non-contact portions that vertically extend along outer surfaces of a battery cell at right and left ends.

Separator cores 4G, 4H have different thicknesses. Specifically, separator core 4H illustrated in FIG. 19 is molded to be thicker than separator core 4G illustrated in FIG. 18. Separator core 4H illustrated in FIG. 19 is molded to be thicker than separator core 4G illustrated in FIG. 18, so that grooves 49 are formed deeply and cooling gaps 8 are widened. However, a separator core can have a constant groove depth regardless of the thickness. Separator 2G, 2H illustrated in these figures has the same structure as a structure of separator frame 3G, and separator cores 4G, 4H having different thicknesses are inserted with respect to separator frames 3G having the same structure, so that depth (h) of battery housing 50 is adjusted, and battery cells 1 having different thicknesses (d) can be ideally stacked. Therefore, even in a case where thickness (d) of battery cell 1 to be used is different for each power supply device 200, it is possible to make center-to-center distance (D) of battery cells 1 constant by selecting thicknesses (t) of separator cores 4 according to thicknesses (d) of battery cells 1, and to make the total length of the entire power supply device constant in power supply devices 200 having the same number of battery cells 1 to be stacked. Accordingly, it is possible to reduce the manufacturing cost by unifying external members such as bind bar 7 to be coupled to a side surface of battery stack 9, gas discharge duct 15 to be disposed on an upper surface side of battery stack 9, or air flow ducts 17 disposed at side surfaces of battery stack 9 as external members of power supply device 200 without individually designing the external members.

(Bind Bar 7)

As illustrated in FIG. 16, bind bar 7 is provided with opening 70 inside side plate 71 excluding an outer peripheral edge, so that a cooling gas can flow into battery stack 9. Opening 70 of bind bar 7 illustrated in the figure is formed so as to be opposed to air flow openings 39 formed on both sides of battery stack 9.

(Air Flow Duct 17)

As described above, power supply device 200 that cools battery cells 1 via the cooling gas that is caused to flow into cooling gaps 8 formed between battery cells 1 is provided with air flow ducts 17 for passing the cooling gas on both sides of battery stack 9 such that the cooling gas flows to air flow opening 39 formed at a side surface of battery stack 9. Air flow ducts 17 are disposed on both sides of battery stack 9 and cause a cooling gas that is forced to flow into air flow ducts 17 to flow from air flow openings 39 of battery stack 9 to cooling gaps 8. Air flow duct 17 has a hollow shape that covers opening 70 of bind bar 7.

Air flow ducts 17 illustrated in FIG. 16 are disposed on both sides of battery stack 9, and one air flow duct 17 serves as supply duct 17A, and another air flow duct 17 serves as exhaust duct 17B, so that a cooling gas supplied from supply duct 17A flows through cooling gaps 8 and is then exhausted from exhaust duct 17B. Air flow duct 17 is coupled to an air blower (not shown) that forces the cooling gas to flow, so that the cooling gas is forced to flow through this blower.

THIRD EXEMPLARY EMBODIMENT

Figure 20:
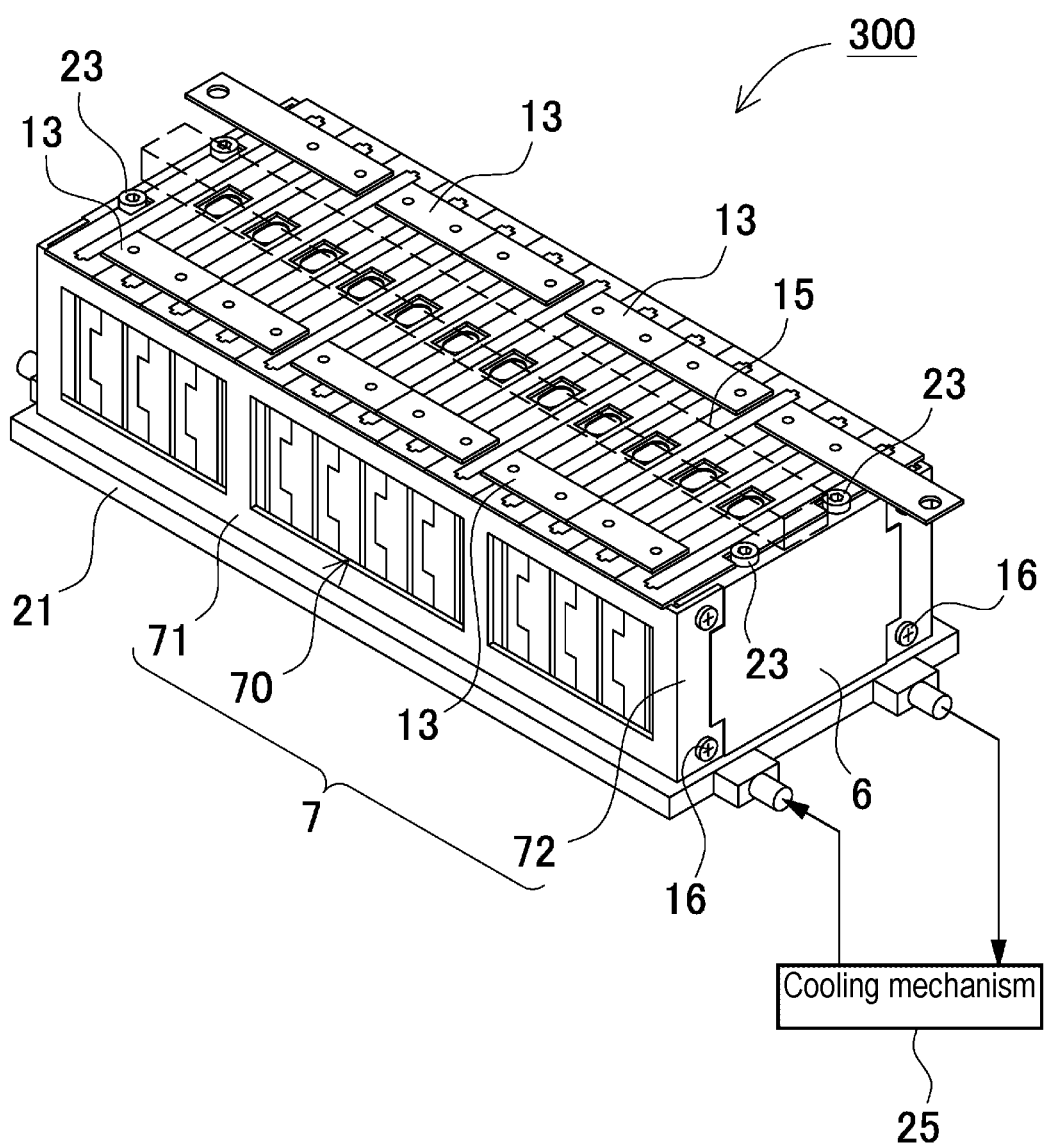
FIG. 20 is a perspective view of a power supply device according to a third exemplary embodiment of the present invention.
Figure 21:
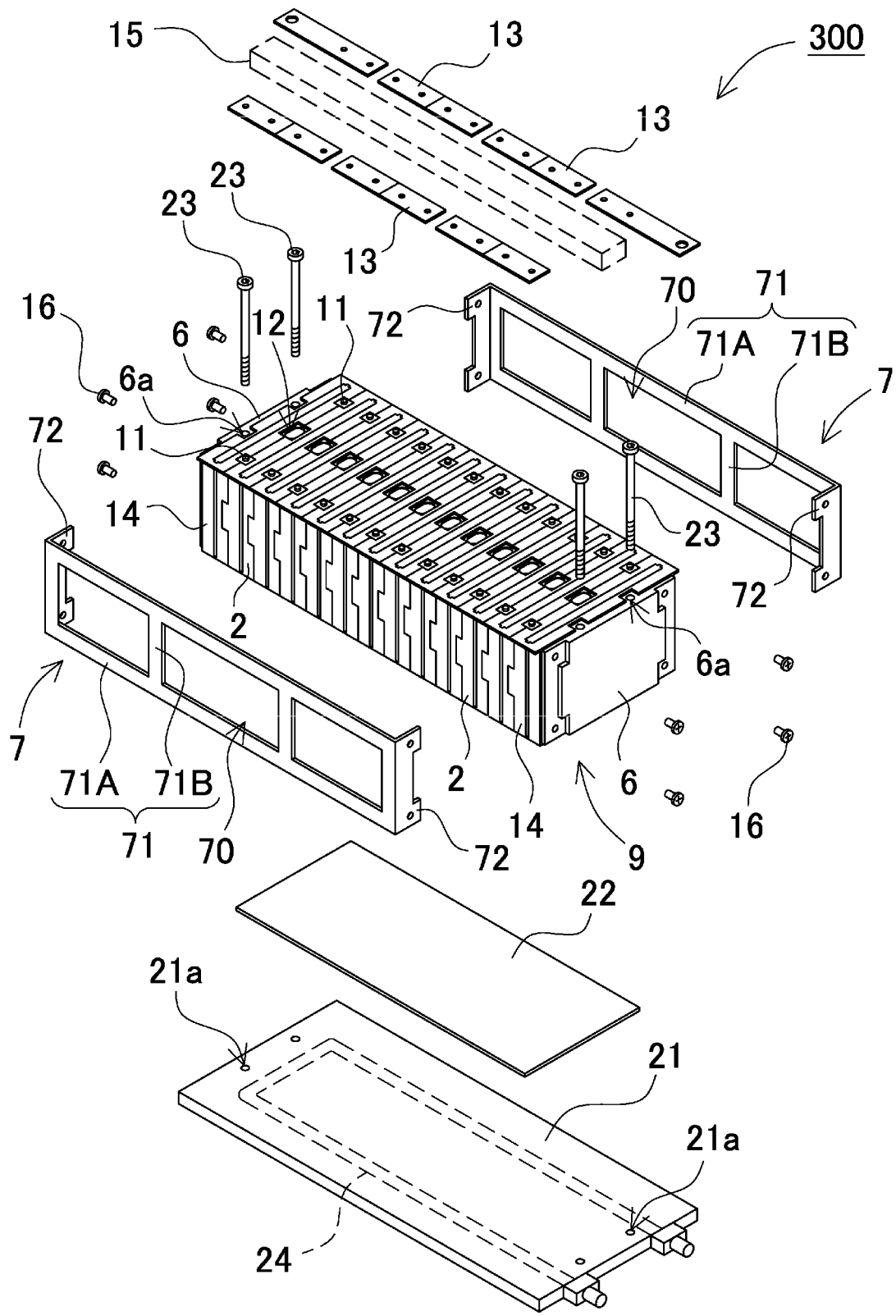
FIG. 21 is an exploded perspective view of the power supply device illustrated in FIG. 20.

Furthermore, a perspective view of power supply device 300 according to a third exemplary embodiment of the present invention is illustrated in FIG. 20, and an exploded perspective view of the power supply device is illustrated in FIG. 21. Although power supply device 300 illustrated in these figures includes a plurality of rectangular battery cells 1 stacked in the thickness direction, and a plurality of separators 2 interposed between battery cells 1 adjacent to each other that are alternately stacked to form battery stack 9 as with power supply device 100 according to the first exemplary embodiment described above, this power supply device 300 is opened at a lower surface of battery stack 9, so that cooling plate 21 is coupled to this part in a thermally conducted state and cools battery cells 1 that constitute battery stack 9. In this power supply device 300, a pair of end plates 6 are also disposed at both ends of battery stack 9 and are fastened by bind bars 7 disposed on both sides of battery stack 9. Furthermore, power supply device 300 includes cooling plate 21 disposed below battery stack 9. In this power supply device 300, it is to be noted that the same configuration elements as configuration elements of the first exemplary embodiment described above can be employed for members other than separator 2I having a structure that exposes bottom surface 1D of battery cell 1 and a member that couples cooling plate 21 to battery stack 9 in a thermally coupled state, and the same reference numerals are given in FIGS. 20 and 21 and detailed description is omitted.

Figure 22:
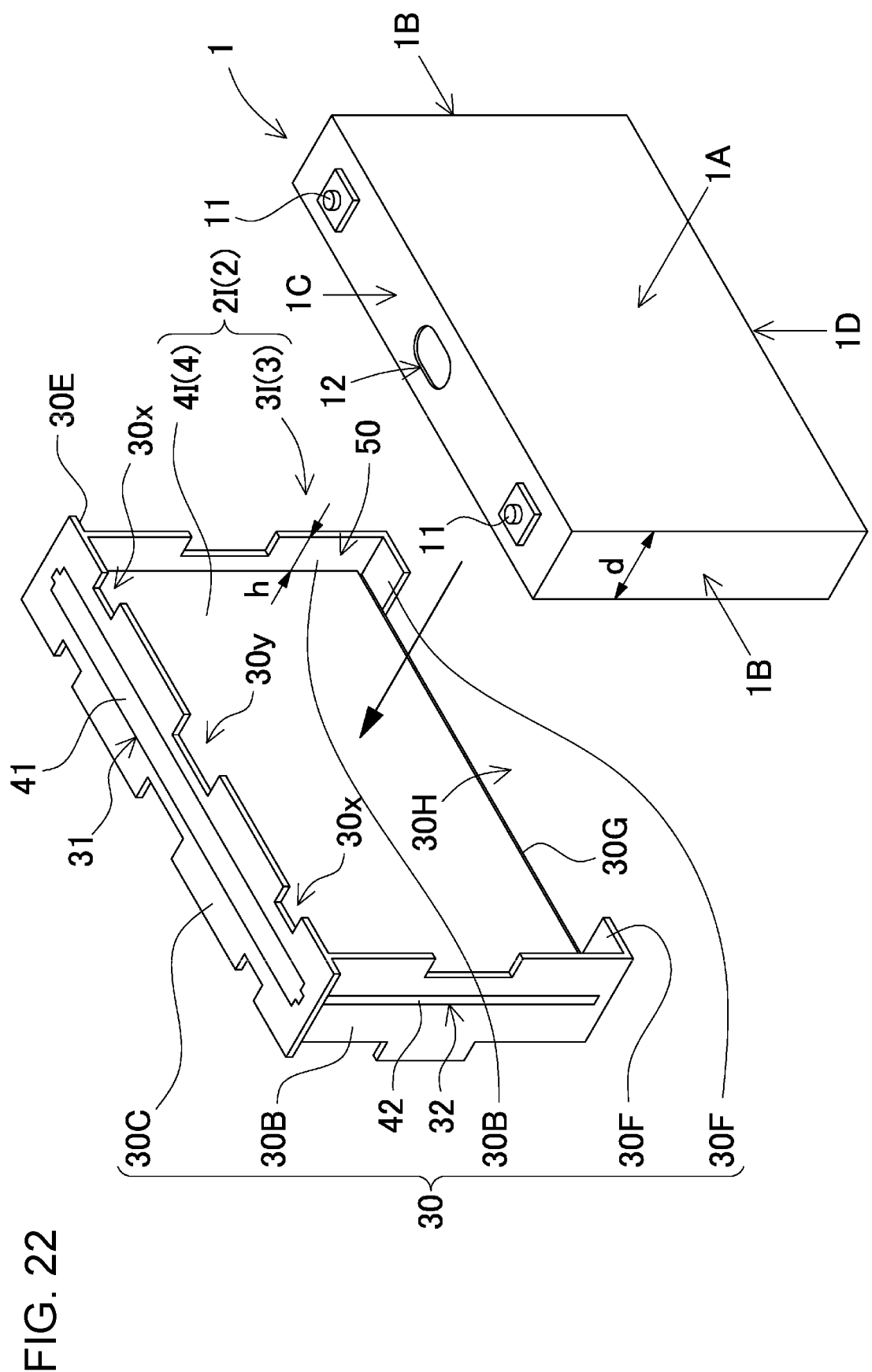
FIG. 22 is a perspective view of a separator and a battery cell of the power supply device illustrated in FIG. 21.
Figure 23:
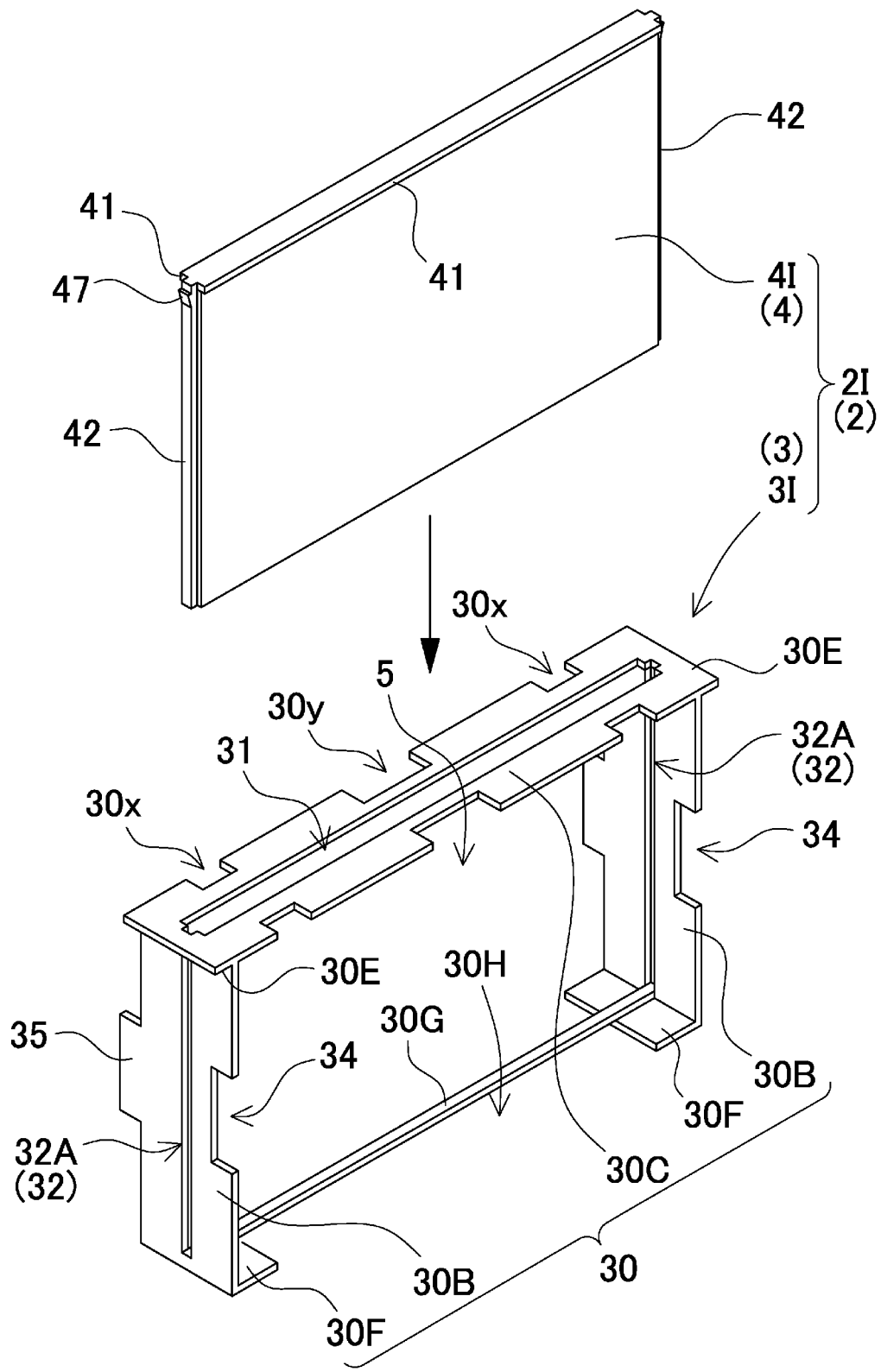
FIG. 23 is an exploded perspective view of the separator illustrated in FIG. 22.

Separator 2I illustrated in FIGS. 22 and 23 is opened on a bottom surface side of battery cell 1, and bottom surface 1D of battery cell 1 is exposed from this opening part, so that heat can be conducted to cooling plate 21 disposed below battery stack 9. In power supply device 300 illustrated in the figures, heat conduction member 22 is sandwiched between battery stack 9 and cooling plate 21 in order to improve heat conduction between battery cells 1 and cooling plate 21. Heat conduction member 22 is, for example, a sheet material or a plate material having flexibility and a cushioning property, and having an excellent heat conduction property. Heat conduction member 22 is sandwiched between battery stack 9 and cooling plate 21, and one surface is adhered to the surface of battery stack 9, while the other surface is adhered to the surface of cooling plate 21 in a wide area, so that battery stack 9 and cooling plate 21 are disposed in an ideal thermally coupled state. This power supply device 300 cools a plurality of battery cells 1 from a bottom surface side via cooling plate 21 that is cooled by a coolant, a cooling liquid, or the like. Accordingly, in separator 2I illustrated in the figures, heat conduction member 22 can be disposed in an opening provided at a bottom surface.

(Separator 2I)

Separator 2I illustrated in FIGS. 22 and 23 releases a bottom surface side of battery cell 1 in order to expose bottom surface 1D of battery cell 1. Separator frame 3I of separator 2I illustrated in the figures is provided with opening 30H by partially opening a lower surface side of peripheral wall 30 along an outer periphery of battery cell 1, so that bottom surface 1D of battery cell 1 is exposed from this opening 30H. Separator frame 3I in FIGS. 22 and 23 has an inner shape into which battery cells 1 can be fitted and prevents positional deviation between adjacent battery cells 1 from each other, so that a plurality of battery cells 1 can be stacked at linear fixed positions. In separator frame 3I in the figures, side walls 30B that cover outer surfaces 1B of battery cell 1, top wall 30C that covers a part of top surface 1C of battery cell 1, and protruding pieces 30F that cover both ends of bottom surface 1D of battery cell 1 are integrally formed as peripheral wall 30 along an outer periphery of battery cell 1. This separator frame 3I has a U shape as a whole with a lower part opened, so that bottom surface 1D of the battery cell is exposed from lower opening 30H. Furthermore, in separator frame 3I illustrated in the figures, central portions of right and left protruding pieces 30F are coupled by coupling bar 30G to hold the entire shape in a frame shape. Thus, separator frame 3I coupled at all four sides can be strengthened as a whole.

Separator frame 3I partially covers top surface 1C of battery cell 1 with top wall 30C, and covers top surfaces 1C of adjacent battery cells 1 so as to expose electrode terminals or gas discharge portions 12. On the other hand, opening 30H that exposes bottom surface 1D of battery cell 1 is provided in a part of separator frame 3I closer to bottom surface 1D. Separator 2I in FIG. 23 is provided with protruding pieces 30F that cover both ends of bottom surface 1D of battery cell 1 so as to be coupled to lower ends of side walls 30B, and bottom surface 1D of battery cell 1 is exposed from opening 30H that is a part between a pair of protruding pieces 30F and is front and rear parts of coupling bar 30G. Protruding pieces 30F provided at a lower end of separator 2I hold corner portions of a lower end of battery cell 1 fitted in separator frame 3I at fixed positions, and are interposed between cooling plate 21 and battery cell 1, so as to insulate battery cell 1 from cooling plate 2131.

In separator 2I illustrated in FIG. 23, separator core 4I is also inserted from insertion opening 31 formed at top wall 30C of separator frame 3I, so that defined space 5 is sectioned into front and rear battery housings 50 as with separators 2A, 2B, 2C illustrated in FIGS. 4 to 6 described above. This separator 2I can also be an optimal separator for a battery cell by various changing the thickness or material of separator core 4I to be inserted into separator frame 3I as with separator 2 described above. That is, in this separator 2I, separator cores 4 having different thicknesses are also inserted with respect to separator frames 3I having the same structure, so that depth (h) of battery housing 50 is adjusted, and battery cells 1 having different thicknesses (d) can be ideally stacked. Therefore, it is possible to make center-to-center distance (D) of stacked battery cells 1 constant so as to make the total length of the entire power supply device constant, and to reduce the manufacturing cost by unifying external members such as bind bar 7 to be coupled to a side surface of battery stack 9, gas discharge duct 15 to be disposed on an upper surface side of battery stack 9, or cooling plate 21 or heat conduction member 22 disposed below battery stack 9 as external members of power supply device 300 without individually designing the external members.

(Cooling plate 21)

Cooling plate 21 cools battery cells 1 with a cooling liquid that circulates inside. In order to efficiently conduct heat energy of battery cells 1 to a cooling liquid, cooling plate 21 is made of a metal sheet such as aluminum or aluminum alloy having an excellent heat conduction property. Cooling plate 21 is internally provided with circuit 24 for a cooling liquid. Circuit 24 is coupled to cooling mechanism 25 so as to cool cooling plate 21. In power supply device 300 illustrated in FIGS. 20 and 21, cooling plate 21 is disposed on a bottom surface of battery stack 9 in a thermally coupled state. However, cooling plate 21 can also be disposed on a side surface of battery stack 9. In power supply device 300 in the figures, cooling plate 21 is a metal sheet having a rectangular outer shape that is equal to or slightly larger than a bottom surface shape of battery stack 9, so as to cool all battery cells 1. Cooling plate 21 is provided with a cavity formed by inserting a metal pipe inside a metal sheet, or is internally provided with a cavity, to internally provide circuit 24 for the cooling liquid.

As described above, battery stack 9 having an opening at a bottom surface is coupled to an upper surface of cooling plate 21 via heat conduction member 22 disposed in the opening. This battery stack 9 is fixed to cooling plate 21 via fixing bolts 23 that vertically penetrate end plates 6. End plate 6 is provided with insertion holes 6a that vertically penetrate end plate 6 in a central portion of an upper surface, so as to couple fixing bolts 23 inserted into these insertion holes 6a to cooling plate 21. End plate 6 illustrated in the figures is provided with two insertion holes 6a in the central portion to be spaced apart from each other. Accordingly, cooling plate 21 is provided with coupling holes 21a, into which fixing bolts 23 are screwed, spaced apart from each other at positions opposed to insertion holes 6a of end plates 6.

FOURTH EXEMPLARY EMBODIMENT

Figure 24:
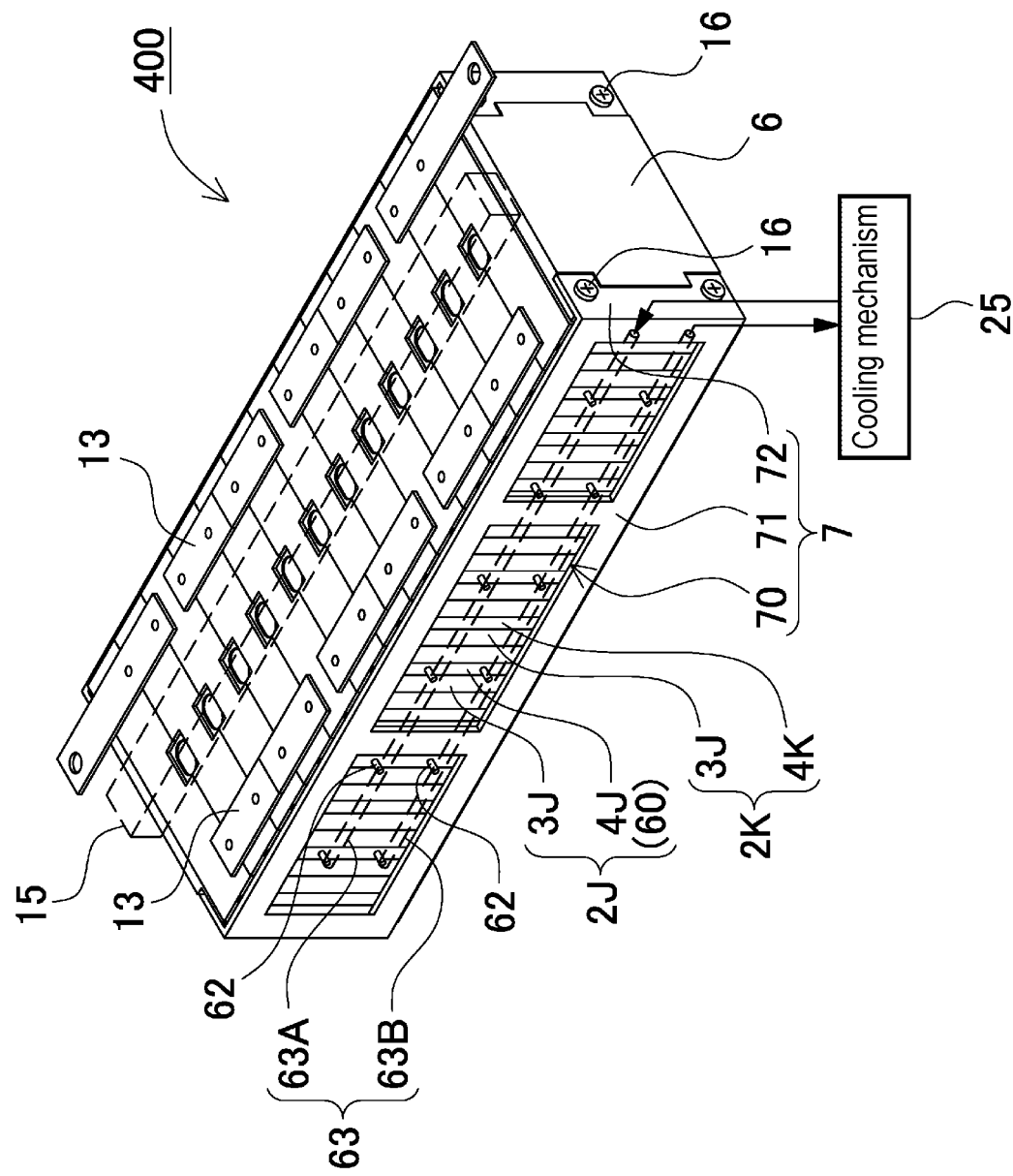
FIG. 24 is a perspective view of a power supply device according to a fourth exemplary embodiment of the present invention.
Figure 25:
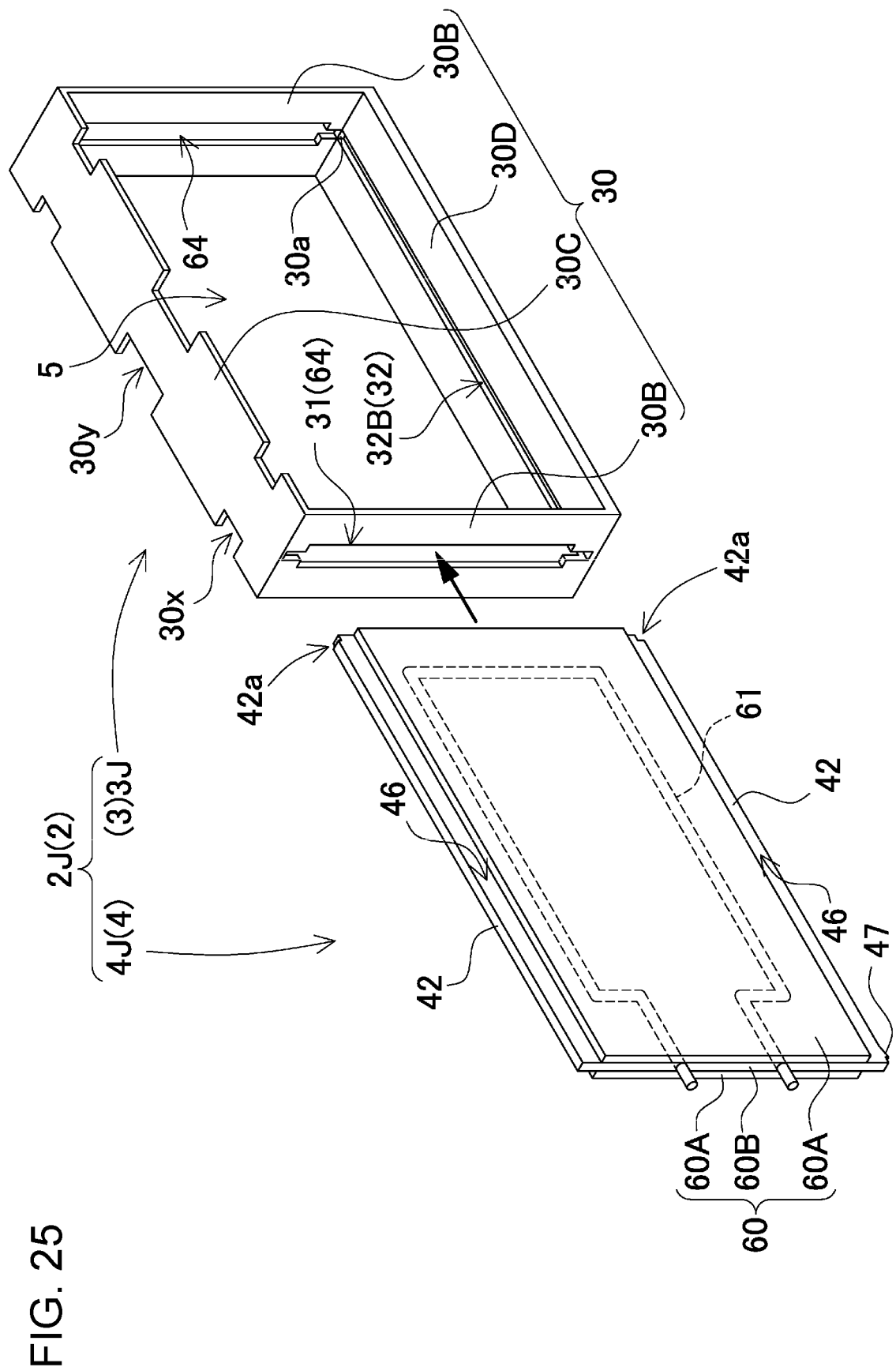
FIG. 25 is an exploded perspective view of a separator of the power supply device illustrated in FIG. 42.

Furthermore, a perspective view of power supply device 400 according to a fourth exemplary embodiment of the present invention is illustrated in FIG. 24, and an exploded perspective view of separator 2 to be used in this power supply device 400 is illustrated in FIG. 25. Power supply device 400 illustrated in FIG. 24 uses separator 2J having separator core 4J that is heat exchange plate 60 as separator 2 to be disposed between battery cells 1. Furthermore, power supply device 400 in FIG. 24 includes pipe arrangement 63 composed of supply pipe 63A and discharge pipe 63B coupled to coupling portions 62 of heat exchange plate 60 in order to circulate a cooling liquid for cooling battery cell 1 to each heat exchange plate 60, and cooling mechanism 25 that is coupled to each heat exchange plate 60 via this pipe arrangement 63 and circulates the cooling liquid through each heat exchange plate 60. In this power supply device 400, it is to be noted that the same configuration elements as configuration elements of the first exemplary embodiment described above can be employed for members other than separator 2, and the same reference numerals are given in FIG. 24 and detailed description is omitted.

(Separator 2J)

In separator 2J illustrated in FIG. 25, separator core 4J sandwiched between battery cells 1 is used as heat exchange plate 60 in order to effectively cool battery cells 1. Separator 2J illustrated in FIG. 25 has a structure in which heat exchange plate 60 that is separator core 4J is inserted with respect to separator frame 3J in the right-left direction. Separator frame 3J in FIG. 25 has insertion opening 31 of separator core 4J at one side wall 30B (left side wall 30B in the figure) as with separator frame 3G illustrated in FIGS. 18 and 19 described above. Separator frame 3J in the figure has slit 64 that extends vertically at side wall 30B, and this slit 64 functions as insertion opening 31 having a shape and a size that allows separator core 4J to pass through. Separator frame 3J illustrated in the figure also has slit 64 that extends vertically at opposed side wall 30B (right side wall 30B in the figure), and this slit 64 has a shape and a size that allow a front end of separator core 4J to be inserted but do not allow the entire separator core to pass through. With this structure, it is possible to fix heat exchange plate 60 while positioning heat exchange plate at an intermediate fixed position of separator frame 3J by fitting both ends of heat exchange plate 60, which is separator core 4J, into a pair of slits 64 formed at side walls 30B. However, a separator frame can be provided with a slit at only one side wall to be an insertion opening, or can be provided with a slit at a bottom wall to be an insertion opening.

(Heat Exchange Plate 60)

Heat exchange plate 60 is disposed on main surface 1A of battery cell 1 in a thermally coupled state, and circulates a cooling liquid inside so as to cool battery cell 1. As illustrated in FIG. 25, heat exchange plate 60 is internally provided with circuit 61 for circulating a cooling liquid. Heat exchange plate 60 is provided with a cavity formed by inserting a metal pipe inside a metal sheet, or is internally provided with a cavity, to internally provide circuit 61 for the cooling liquid. In heat exchange plate 60 in the figure, pipes coupled to both ends of circuit 61 as coupling portions 62 are protruded outward from side surface of heat exchange plate 60. As illustrated in FIG. 24, one of a pair of coupling portions 62 is coupled to cooling liquid supply pipe 63A, and the other is coupled to cooling liquid discharge pipe 63B on a side surface of battery stack 9. Each heat exchange plate 60 is coupled to cooling mechanism 25 via a pair of pipe arrangements 63.

Heat exchange plate 60 uses a metal sheet such as aluminum or aluminum alloy having an excellent heat conduction property in order to efficiently conduct heat energy of battery cell 1 to the cooling liquid. Thus, in a case where the surface of separator core 4J, which is heat exchange plate 60, is a metal sheet in order to improve the thermal conductivity, the surface of battery cell 1 is preferably covered with an insulating film or the like for insulation. However, the surface of the heat exchange plate may be subjected to insulation treatment by coating the surface of the heat exchange plate with a resin or by applying an insulating paint, for example.

Heat exchange plate 60 in FIG. 25 has upper and lower edges functioning as guide ridges 42 that can be inserted along guide portions 32 provided at top wall 30C and bottom wall 30D of separator frame 3J. Guide portions 32 in the figure are provided with guide grooves 32B at inner surfaces of top wall 30C and bottom wall 30D. Furthermore, heat exchange plate 60 illustrated in FIG. 25 is provided with non-contact portions 46 that do not come into contact with main surface 1A of opposed battery cell 1 along ends opposed to top surface 1C and bottom surface 1D of battery cell 1. These non-contact portions 46 are formed by thinly molding the upper and lower ends of heat exchange plate 60. It is to be noted heat exchange plate 60, in which upper and lower ends are made thinner than a central portion, and guide ridges 42 and non-contact portion 46 are provided, has, for example, a three-layer structure having metal sheet 61A stacked on and fixed to both surfaces of hollow core material 61B in which a metal pipe to be circuit 62 can be disposed, and upper and lower ends of intermediate core material 61B protrude from metal sheet 61A, so that regions formed to be thinner than a central part are formed at upper and lower ends, and guide ridges 42 or the non-contact portions 46 can be formed as illustrated in FIG. 25. However, a heat exchange plate can be formed by pressing a metal sheet, or can be molded by casting.

As described above, a power supply device in which separator 2J having separator core 4J as heat exchange plate 60 is disposed between battery cells 1 can cool battery cells 1 most effectively by disposing separators 2J including heat exchange plates 60 between all battery cells 1 to be stacked. However, a power supply device does not necessarily have to have separators 2J including heat exchange plates 60 between all battery cells 1, but can have separator 2J including heat exchange plate 60 only at a specific position of battery stack 9. That is, it is possible to use separator 2J including heat exchange plate 60, and separator 2K having a separator core having a different material or structure, for example, separator core 4K made of an insulating material, in combination. For example, power supply device 400 illustrated in FIG. 24 has twelve battery cells 1 connected in two parallel six series connection. In this power supply device 400 in which separator 2J including heat exchange plate 60 is disposed between battery cells 1 connected in parallel to each other, heat exchange plates 60 are brought into contact with all battery cells 1 and effectively cool the battery cells, while separator 2K including separator core 4K made of an insulating material is disposed between battery cells 1 connected in series with each other, so that a short circuit between battery cells 1 having a voltage difference is reliably prevented. Thus, the power supply device can achieve an ideal structure that uses optimal separator 2 according to the application, by variously changing separator core 4 according to a number of battery cells 1 to be stacked, or the connection state.

Although power supply devices 300, 400 in the third and fourth exemplary embodiments described above have shown examples of cooling battery cells 1 by circulating a cooling liquid through heat exchange plate 60 or cooling plate 21, a heating liquid can be circulated through heat exchange plate 60 or cooling plate 21 instead of the cooling liquid, so as to heat battery cells 1. With this configuration, it is possible to improve deterioration of the performance of battery cells 1 at a low temperature by heating battery cells 1 in a low temperature state in cold regions, a cold morning in winter, or the like. In this case, by providing a heating mechanism instead of cooling mechanism 25 described above, it is possible to circulate a heating liquid in circuit 61, 24 of heat exchange plate 60 or cooling plate 21. It is to be noted that cooling mechanism 25 can also serve as a heating mechanism when being configured to include a temperature adjusting mechanism capable of heating as well as cooling.

FIFTH EXEMPLARY EMBODIMENT

Figure 26:
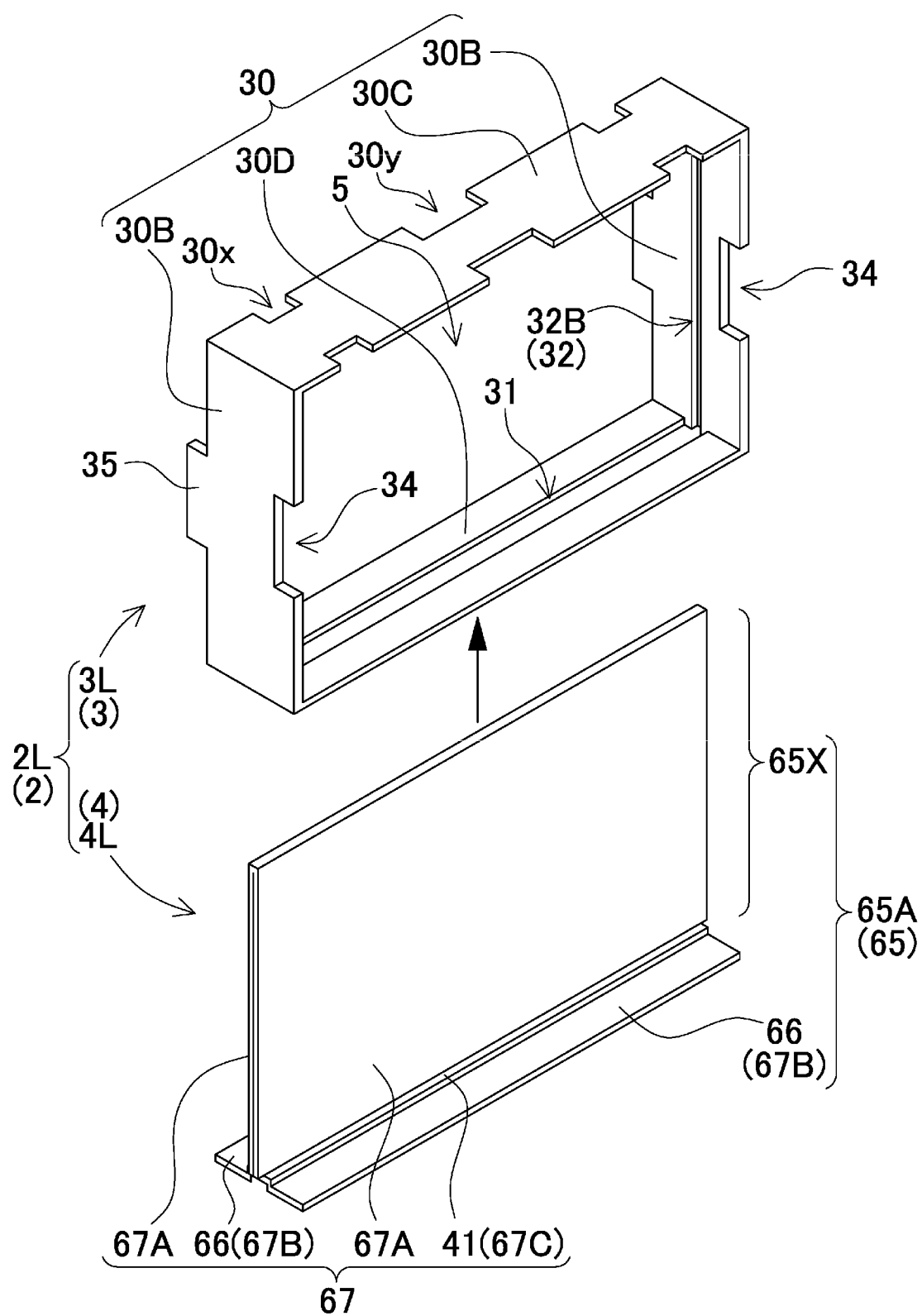
FIG. 26 is an exploded perspective view of a separator used in a power supply device according to a fifth exemplary embodiment of the present invention.
Figure 27:
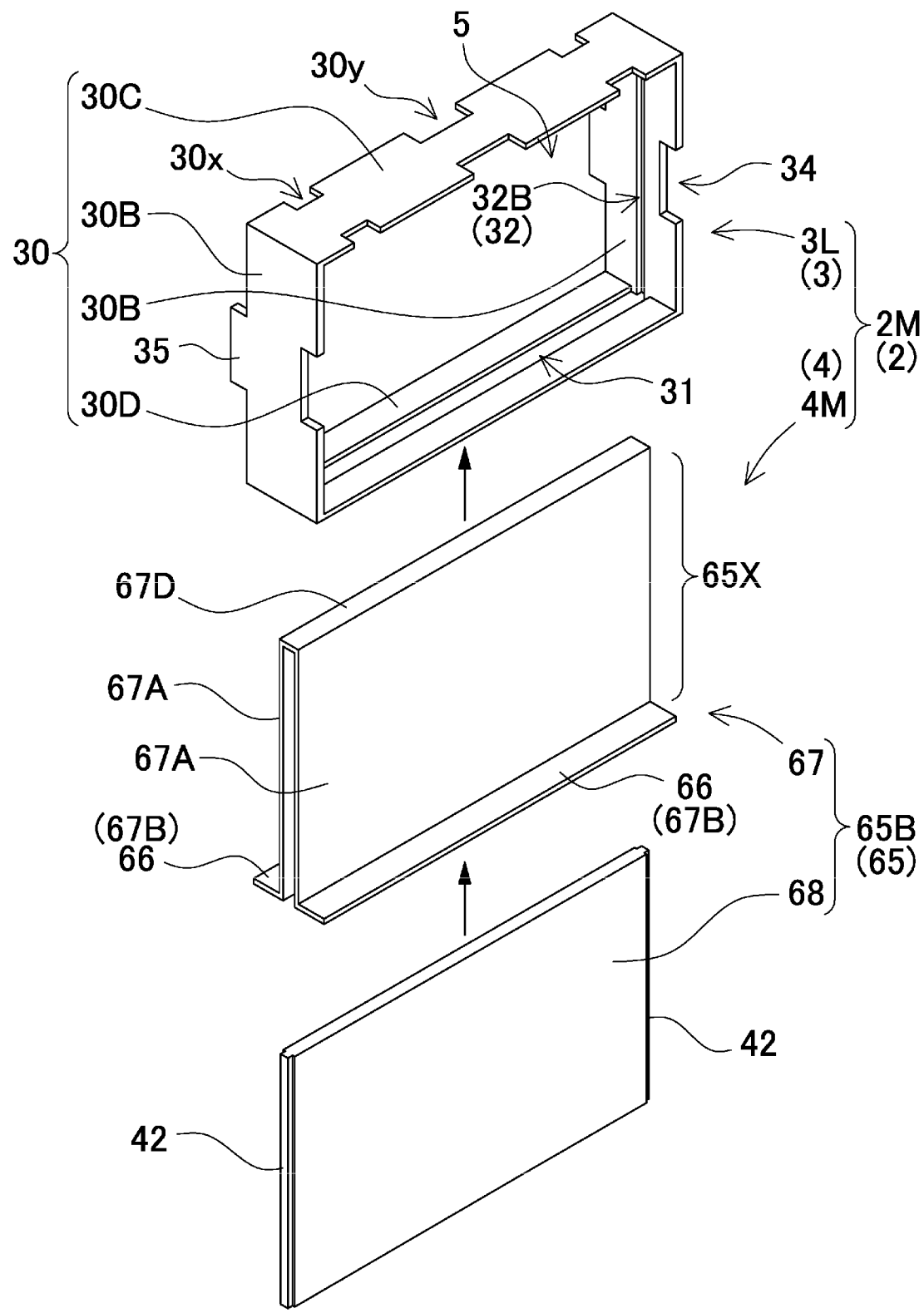
FIG. 27 is an exploded perspective view illustrating another example of the separator used in the power supply device according to the fifth exemplary embodiment of the present invention.
Figure 28:
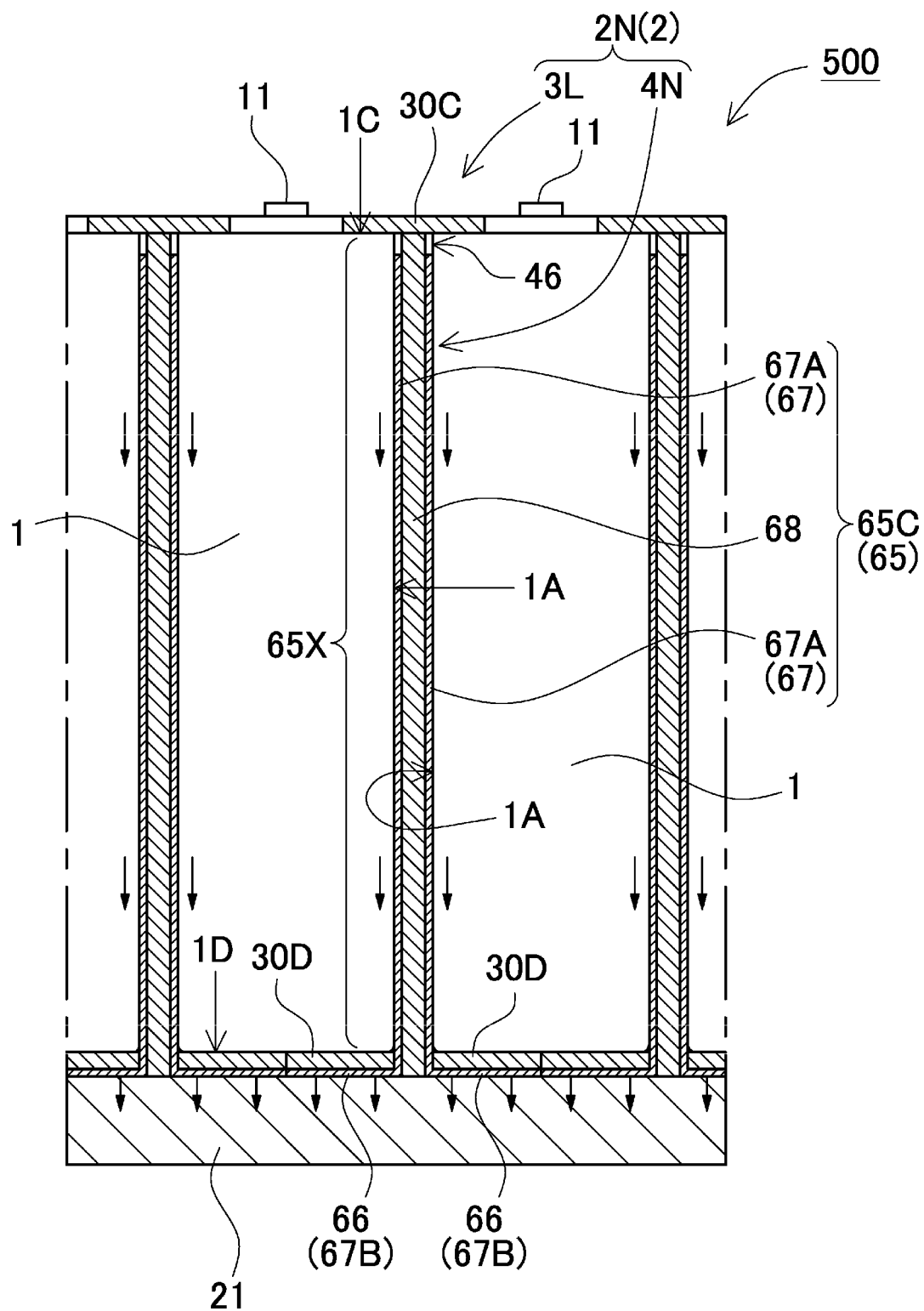
FIG. 28 is an enlarged vertical sectional view of the power supply device according to the fifth exemplary embodiment of the present invention.

Furthermore, in separator 2 that uses a metal member excellent in heat conduction for separator core 4, separator core 4 can function as heat conduction plate 65 as illustrated in FIGS. 26 to 28, and this heat conduction plate 65 can be disposed on main surface 1A of battery cell 1 in a thermally coupled state, and can include heat radiation portion 66 disposed outside peripheral wall 30 of separator frame 3.

(Separator 2L, 2M, 2N)

In separator 2L, 2M, 2N illustrated in FIGS. 26 to 28, separator core 4L, 4M, 4N sandwiched between battery cells 1 function as heat conduction plate 65 in order to effectively cool battery cells 1. Separator 2L, 2M, 2N illustrated in the figures has a structure in which heat conduction plate 65 that is separator core 4L, 4M, 4N is vertically inserted with respect to separator frame 3L. Separator frame 3L in the figures has insertion opening 31 of separator core 4L, 4M, 4N at bottom wall 30D. Separator frame 3L in the figures has insertion opening 31 having a shape and a size that allow separator core 4L, 4M, 4N to pass through at an intermediate portion of bottom wall 30D, so that separator core 4L, 4M, 4N that is heat conduction plate 65 is inserted from below through insertion opening 31 to above. However, the separator can have an insertion opening at a side wall of the separator frame, so that the separator core that is a heat conduction plate is inserted in the right-left direction.

(Heat Conduction Plate 65)

Heat conduction plate 65 is disposed on main surface 1A of battery cell 1 in a thermally coupled state, and conducts heat generated by battery cell 1 to heat radiation portion 66 so as to radiate heat to the outside. Heat conduction plate 65 illustrated in FIGS. 26 to 28 includes main body 65X that is inserted into defined space 5 of separator frame 3L and is disposed at an intermediate portion of peripheral wall 30, and heat radiation portion 66 that is disposed outside peripheral wall 30 of separator frame 3L. Heat conduction plate 65 illustrated in the figures has an inverted T-shaped cross section, and the plate-shaped part disposed on a lower surface of bottom wall 30D functions as heat radiation portion 66.

Heat conduction plate 65 uses metal sheet 67 such as aluminum or aluminum alloy having an excellent heat conduction property in order to efficiently conduct heat energy of battery cell 1. In heat conduction plate 65 illustrated in the figures, a region opposed to main surface 1A of battery cell 1 functions as body plate 67A constituted of metal sheet 67, so that the heat conduction plate can be disposed on main surface 1A of battery cell 1 in a thermally coupled state. Furthermore, in metal sheet 67, an end that protrudes outward from peripheral wall 30 is bent in an L shape, and this bent piece 67B functions as heat radiation portion 66. Furthermore, heat conduction plate 65 in FIGS. 26 to 28 is provided with guide ridges 42 at right and left side edges, so that guide ridges 42 can be inserted along guide portions 32 provided at both side walls 30B of separator frame 3L. Guide portion 32 in the figures is provided with guide groove 32B at an inner surface of side wall 30B.

(Heat Conduction Plate 65A)

Heat conduction plate 65A illustrated in FIG. 26 is formed by bending one metal sheet 67 to have an inverted T overall shape. In this heat conduction plate 65A, rectangular metal sheet 67 is folded back at a central portion so as to form body plates 67A stacked on each other, and both ends of metal plate 67 are bent outward, so that these bent pieces 67B form heat radiation portions 66. Step portion 67C is provided at a boundary between a lower end of body plate 67A and bent piece 67B, so that closing portion 41 to be fitted into insertion opening 31 of separator frame 3L is formed. In this heat conduction plate 65A, the total length of body plate 67A is formed longer than the total length of bent piece 67B that is heat radiation portion 66 and step portion 67C that functions as closing portion 41, and right and left side edges of body plate 67A are used as guide ridges 42 that protrude in the right-left direction so as to be guided to guide portions 32 of separator frame 3L. However, in a heat conduction plate formed by bending a metal sheet, the step portion can be omitted, and the body plate and the heat radiation portion can have the same width. Above heat conduction plate 65A has a simple structure in which metal sheet 67 is bent, while the thickness of separator core 4L can be reduced and the battery housing can be formed to be deep. Although not shown, in this heat conduction plate 65A, a heat resistant sheet is sandwiched between body plates 67A stacked on each other, so as to suppress heat conduction between adjacent battery cells.

(Heat Conduction Plate 65B)

Heat conduction plate 65B illustrated in FIG. 27 is composed of one metal sheet 67 obtained by bending into a rectangular wave shape so as to have a substantially inverted T-shaped cross section, and intermediate plate 68 inserted into the intermediate of this metal sheet 67, in order to form a heat conduction plate thicker than heat conduction plate 65A described above. Metal sheet 67 illustrated in the figure has a shape in which upper ends of two body plates 67A opposed to main surfaces 1A of battery cells 1 disposed on both sides of separator core 4M are coupled in a U shape by coupling portion 67D, so that a gap for inserting intermediate plate 68 is formed between two body plates 67A. Intermediate plate 68 inserted between opposed body plates 67A is provided with guide ridges 42 that protrude outward on both side surfaces, and these guide ridges 42 protrude outward from both side edges of metal sheet 67 so as to be guided to guide portions 32 received by side walls 30B of separator frame 3L. Intermediate plate 68 is, for example, a plate obtained by molding a flame-retardant material or a plate excellent in heat resistance, and is characterized by being capable of efficiently conducting heat generated at each battery cell 1 from body plate 67 to heat radiation portion 66 while effectively preventing heat conduction between adjacent battery cells 1.

(Heat Conduction Plate 65C)

Furthermore, heat conduction plate 65C illustrated in FIG. 28 has a structure in which two metal sheets 67 are stacked and fixed on both surfaces of intermediate plate 68 having an insulating property. Heat conduction plate 65C illustrated in the figure is formed by stacking metal sheet 67 bent in an L-shaped cross section on both surfaces of intermediate plate 68, and heat radiation portion 66 bent outward is provided at a lower end of body portion 65X, so that the overall shape becomes an inverted T shape. In heat conduction plate 65C having this structure, metal sheets 67 disposed on both surfaces of intermediate plate 68 can be insulated from each other by intermediate plate 68, so that a short circuit between adjacent battery cells 1 can be effectively prevented. Intermediate plate 68 can also be a heat insulating material. This intermediate plate 68 can effectively cool each battery cell 1 while suppressing heat conduction between battery cells 1 by thermally insulating two metal sheets 67.

Furthermore, heat conduction plate 65C illustrated in FIG. 28 is provided with non-contact portion 46 that does not come into contact with main surface 1A of opposed battery cell 1 along an end opposed to top surface 1C of battery cell 1. This non-contact portion 46 is formed by thinly molding an upper end of heat conduction plate 65C. For example, in heat conduction plate 65C illustrated in FIG. 28, non-contact portion 46 that does not come into contact with main surface 1A of battery cell 1 is provided by adjusting the size of metal sheet 67 to be stacked on both surfaces of intermediate plate 68.

Above heat conduction plate 65 has an inverted T overall shape. Heat conduction plate 65 having this shape has a feature that the area of heat radiation portion 66 can be increased. However, the heat conduction plate may also have an L-shaped cross section. The heat conduction plate having this shape can be easily manufactured by bending one metal sheet.

Moreover, in above heat conduction plate 65, metal sheet 67 is disposed on both surfaces of separator core 4L, 4M, 4N, so that both surfaces can be disposed on main surfaces 1A of battery cells 1 in a thermally coupled state. With this structure, it is possible to efficiently cool battery cells 1 disposed on both surfaces of separator core 4L, 4M, 4N. However, in the heat conduction plate, the metal sheet can be disposed on only one surface of the separator core. This heat conduction plate has a structure in which a metal sheet is stacked on one side surface of an intermediate plate having an insulating property, for example, so that adjacent battery cells can be insulated from each other reliably.

In above separator 2L, 2M, 2N, the thickness of separator core 4L, 4M, 4N can be adjusted by variously changing the thickness or shape of metal sheet 67 and intermediate plate 68 that constitute heat conduction plate 65. That is, in this separator 2L, 2M, 2N, separator cores 4L, 4M, 4N having different thicknesses are also inserted with respect to separator frames 3L having the same structure, so that depth (h) of battery housing 50 is adjusted, and battery cells 1 having different thicknesses (d) can be ideally stacked.

As described above, separator core 4L, 4M, 4N is used as heat conduction plate 65, and separator 2L, 2M, 2N that includes heat radiation portions 66 outside separator frame 3L can efficiently cool battery cells 1 by radiating heat from heat radiation portions 66 disposed outside. In particular, separator 2L, 2M, 2N having this structure can cool battery cells 1 further effectively by thermally coupling heat radiation portions 66 of heat conduction plate 65 to cooling plate 21 disposed on the surface of battery stack 9 as illustrated in FIG. 28. Power supply device 500 illustrated in FIG. 28 conducts heat from body plates 67A of heat conduction plate 65 thermally coupled to main surfaces 1A of battery cells 1 toward heat radiation portions 66, and achieves effective cooling by radiating heat to cooling plate 21 thermally coupled to heat radiation portions 66 outside separator frame 3L as indicated by arrows in the figure. It should be noted that cooling plate 21 does not necessarily have to be disposed on a bottom surface of battery stack 9, but can be disposed on a side surface of battery stack 9. In this case, the separator is configured in a manner such that the heat conduction plate, which is the separator core, is inserted from an insertion opening formed at a side surface of the separator frame, and the heat radiation portion disposed at an outer surface of the side wall of the separator frame is thermally coupled to the cooling plate so as to radiate heat.

Moreover, heat radiation portion 66 of heat conduction plate 65 does not necessarily have to have a structure thermally coupled to cooling plate 21 to radiate heat, but can radiate heat via a bind bar by radiating heat into the atmosphere from a heat radiation portion disposed at an outer surface of the separator frame, or by thermally coupling the bind bar to the heat radiation portion.

As described above, power supply device having a structure in which both surfaces of separator core 4L, 4M, 4N are disposed on main surfaces 1A of battery cells 1 in a thermally coupled state so as to cool battery cells 1 most effectively by disposing separators 2L, 2M, 2N including heat conduction plates 65 between all stacked battery cells 1. However, a power supply device does not necessarily have to have separators 2L, 2M, 2N including heat conduction plates 65 between all battery cells 1, and can also have separator 2L, 2M, 2N including heat conduction plate 65 only at a specific position of battery stack 9 as with power supply device 400 according to the fourth exemplary embodiment described above. That is, separator 2L, 2M, 2N including heat conduction plate 65, and a separator including a separator core having a different material or structure can be used in combination. For example, a power supply device may have a structure in which separators including heat conductive plates and separators including separator cores made of an insulating material are alternately disposed. With this structure, it is possible to effectively cool all the battery cells by thermally coupling the battery cells to separator cores constituted of heat conduction plates while reducing the overall cost.

Moreover, in a power supply device having a structure in which a plurality of battery cells are connected in parallel and in series, a separator including a heat conductive plate is disposed between battery cells connected in parallel with each other so that these battery cells are effectively cooled, while a separator including a separator core made of an insulating material is disposed between battery cells connected in series to each other so that a short circuit between battery cells with a voltage difference is reliably prevented.

INDUSTRIAL APPLICABILITY

A power supply device according to the present invention can be suitably utilized as a power supply device for a plug-in hybrid electric vehicle, a hybrid electric vehicle, an electric vehicle, or the like, which can switch between an EV driving mode and an HEV driving mode. A power supply device according to the present invention can also be appropriately utilized for applications such as a backup power supply that can be installed in a computer server rack, a backup power supply for wireless base stations for cellular phones or the like, a power storage power supply for homes or factories, a power storage device to be used in combination with a solar battery such as a power supply of a street light, and a backup power supply for a signal or the like.

The invention claimed is:
1. A power supply device comprising:
a plurality of battery cells each having a rectangular shape stacked in a thickness direction; and
a plurality of separators respectively interposed between adjacent ones of the plurality of battery cells,
wherein each of the separators includes
a separator frame having an insulating property that forms a defined space surrounded in a frame shape, and
a separator core that is inserted into the defined space surrounded by the separator frame and is disposed between adjacent ones of the plurality of battery cells,
wherein the separator frame has a shape that fits an outer shape of each of the battery cells having a rectangular shape and has a peripheral wall that covers an outer peripheral surface of each of the battery cells;
the separator core has a plate shape, is located at an intermediate portion of the separator frame in a stacking direction of the battery cells, and is disposed in a vertical posture with respect to the peripheral wall;

the peripheral wall of the separator frame includes:
a top wall that partially covers top surfaces of the adjacent ones of the battery cells, and
a pair of side walls that partially cover outer surfaces of the adjacent ones of the battery cells; and
the separator core has a width equal to or greater than a distance between the pair of side walls of the separator frame; and wherein the separator frame has an insertion opening for the separator core at the top wall, and includes guide portions that guide both side edges of the separator core inserted from the insertion opening into the defined space at the pair of side walls.

2. The power supply device according to claim 1, wherein the separator core divides the defined space into two parts so as to form a battery housing that partially houses each of the battery cells on each surface side of the separator core.

3. The power supply device according to claim 2, wherein a depth (h) of the battery housing is ½ of a thickness (d) of each of the battery cells.

4. The power supply device according to claim 1, wherein the peripheral wall of the separator frame further includes a bottom wall that partially covers bottom surfaces of the adjacent ones of the battery cells.

5. The power supply device according to claim 4, wherein the separator frame has an insertion opening for the separator core at the bottom wall, and includes guide portions that guide both side edges of the separator core inserted from the insertion opening into the defined space at the pair of side walls.

6. The power supply device according to claim 1, wherein each of the guide portions is a guide slit formed at each of the side walls, or a guide groove formed at an inner surface of each of the side walls.

7. The power supply device according to claim 1, wherein the separator frame has an insertion opening for the separator core at one of the side walls, and includes guide portions that guide an upper end and a lower end of the separator core inserted from the insertion opening into the defined space at the top wall and the bottom wall.

8. The power supply device according to claim 7, wherein each of the guide portions is a guide slit formed at each of the top wall and the bottom wall, or a guide groove formed at an inner surface of each of the top wall and the bottom wall.

9. The power supply device according to claim 2, wherein
the separator core has an outer shape that fits an inner shape of the separator frame, and can be press-fitted from an opening of the defined space with respect to the separator frame to be disposed in the defined space,
the separator core includes an engaging protrusion portion that protrudes outward from an outer peripheral surface, and the separator frame is provided with an engaging portion that guides the engaging protrusion portion at the peripheral wall, and
the engaging protrusion portion is guided to the engaging portion, to cause the separator core to be disposed at an intermediate portion of the separator frame.

10. The power supply device according to claim 2, wherein
the separator core includes an insertion protrusion portion that protrudes outward from an outer peripheral surface, and the separator frame is provided with an insertion portion for inserting the insertion protrusion portion at an intermediate portion of the peripheral wall, and
the insertion protrusion portion is guided to the insertion portion, to cause the separator core to be coupled at a fixed position of the separator frame.

11. The power supply device according to claim 2, wherein
the separator core has an outer shape that fits an inner shape of the separator frame, and can be inserted in the stacking direction of the battery cells with respect to the separator frame to be disposed in the defined space,
the separator core includes an insertion protrusion portion that protrudes outward from an outer peripheral surface, and the separator frame is provided with a cutout portion that guides the insertion protrusion portion at the peripheral wall, and
the insertion protrusion portion is guided to the cutout portion, to cause the separator core to be disposed at an intermediate portion of the separator frame.

12. The power supply device according to claim 2, wherein
the separator core includes a groove that forms a cooling gap between the separator core and one of the battery cells, and
the separator frame has an air flow opening that communicates with the cooling gap and is formed at the peripheral wall.

13. The power supply device according to claim 2, wherein the separator core puts an outer peripheral portion of an opposed surface opposed to each of the battery cells into close contact with an outer peripheral portion of a main surface of each of the battery cells as a contact portion, and is provided with a central concave portion depressed in a concave shape at a central portion of the opposed surface.

* * * * *